HIGH-SPEED STEERING CIRCUIT FOR FREQUENCY SHIFT PULSE SENDER

Filed Jan. 15, 1962 6 Sheets-Sheet 1

INVENTORS: L. T. ANDERSON
C. E. KRESS

BY I. R. McCorkendale
ATTORNEY

March 17, 1964 L. T. ANDERSON ETAL 3,125,642

HIGH-SPEED STEERING CIRCUIT FOR FREQUENCY SHIFT PULSE SENDER

Filed Jan. 15, 1962 6 Sheets-Sheet 2

INVENTORS L.T. ANDERSON
C.E. KRESS
BY J. R. McCorkendale
ATTORNEY

March 17, 1964 L. T. ANDERSON ETAL 3,125,642

HIGH-SPEED STEERING CIRCUIT FOR FREQUENCY SHIFT PULSE SENDER

Filed Jan. 15, 1962 6 Sheets-Sheet 3

INVENTORS L. T. ANDERSON
C. E. KRESS

BY G. R. McCorkendale

ATTORNEY

HIGH-SPEED STEERING CIRCUIT FOR FREQUENCY SHIFT PULSE SENDER

Filed Jan. 15, 1962 6 Sheets-Sheet 4

INVENTORS: L. T. ANDERSON
C. E. KRESS

BY J. R. McCartney

ATTORNEY

March 17, 1964 L. T. ANDERSON ETAL 3,125,642

HIGH-SPEED STEERING CIRCUIT FOR FREQUENCY SHIFT PULSE SENDER

Filed Jan. 15, 1962 6 Sheets-Sheet 5

INVENTORS: L. T. ANDERSON
C. E. KRESS

BY F. R. McCorkendale
ATTORNEY

March 17, 1964 L. T. ANDERSON ET AL 3,125,642

HIGH-SPEED STEERING CIRCUIT FOR FREQUENCY SHIFT PULSE SENDER

Filed Jan. 15, 1962 6 Sheets-Sheet 6

INVENTORS: L. T. ANDERSON
C. E. KRESS

BY F. R. McCorkendale

ATTORNEY

United States Patent Office 3,125,642

Patented Mar. 17, 1964

3,125,642

HIGH-SPEED STEERING CIRCUIT FOR FREQUENCY SHIFT PULSE SENDER

Lynn T. Anderson, Gahanna, and Charles E. Kress, Columbus, Ohio, assignors to Bell Telephone Laboratories, Incorporated, New York, N.Y., a corporation of New York Filed Jan. 15, 1962, Ser. No. 166,328
11 Claims. (Cl. 179—18)

This invention relates to a frequency shift pulse sender, and more particularly to a high-speed steering circuit for frequency shift pulse senders.

Frequency shift pulse senders are used in data or voice communication systems where transmission of information from one point to another is on a frequency shift pulse signaling basis, information being transmitted by frequency shift pulses applied over the tip and ring conductors of the line. Commonly, a single voice frequency is utilized which is shifted to produce marking signals, each digit or "bit" of information being represented by a different combination of mark (direct-current output) and/or space (no direct-current output) signals, each combination occupying six time spaces. In addition to the combinations assigned to the digits or other information bits, a 5-of-6 combination (KP) is assigned as a "gate opener" pulse and a different 2-of-6 combination is assigned as an "end-of-pulse" signal. These last two combinations serve, respectively, to activate and deactivate the frequency shift receiver or detector.

As one illustrative example, frequency shift pulse senders may be used in present crossbar telephone switching systems, within the switching center, in conjunction with the other basic circuits in a manner similar to that in which multifrequency senders are commonly used. The use of a multifrequency sender in an automatic telephone switching system is disclosed, for example, in J. W. Gooderham et al. Patent 2,868,884, January 13, 1959, while A. J. Busch Patent 2,585,904, February 19, 1952, discloses an automatic telephone system of the crossbar type in conjunction with which multifrequency senders and frequency shift pulse senders can advantageously be utilized.

In accordance with the normal operation of a crossbar telephone system, the originating subscriber dials into an originating register the calling information, that is, the area code, where required, the office code and the numerical digits. When the entire number information has been received it is transferred to the marker by the originating register. The marker then selects an idle sender, connects thereto through the outgoing sender connector, and at the same time selects an idle trunk and connects the sender thereto by means of the sender link.

Through the outgoing sender connector, the marker now transfers to the sender all the information necessary for completion of the call; this includes the control digit, the number of digits to delete, if any, the arbitrary digits to be prefixed, if any, and the type of trunk. (Arbitrary added digits are usually utilized in code conversion or code prefixing, while some or all of the code digits may be deleted when direct trunks are available to the called office.) When the sender receives the "advance" signal from the marker, it proceeds to outpulse the KP, "start-pulsing" or "begin-pulsing" signal, the required digits, and the "end-of-pulsing" signal. Following this the sender is released.

In present day communication systems, especially in the instance of data systems, the requirement of high speed transmission is paramount and transmission at rates of the order of 75 digits per second is contemplated. Provision of a sender circuit capable of operating at a relatively high speed therefore becomes important.

Accordingly it is an object of our invention to substantially enhance the performance of a frequency shift pulse sender with regard to its operating speed.

Another object of the invention is to improve the operation of the digit steering circuit of a frequency shift pulse sender.

In accordance with a specific embodiment of the invention a frequency shift pulse sender is provided with a scanning circuit divided into two areas, a "first order" or "odd" area and a "second order" or "even" area. The digit steering circuit comprises two paths, or "rails," one connected to the odd area of the scanning circuit and the other connected to the even area thereof. "First order" or "odd" and "second order" or "even" digits are transmitted alternately over the respective paths to the respective scanning areas. During an even scan the steering circuit guides the next odd digit to the odd digit scan area, during the odd scan the next even digit is prepared, and so on. Means are included for compensating for the addition of arbitrary digits and the deletion of registered digits, which actions are inherent in the operation of the sender, whereby to assure that each digit is steered to the proper area of the scanning circuit.

A feature of our invention is a scanning circuit having an odd area and an even area.

A further feature of the invention is a two-path digit steering circuit, one path connected to the odd area of the scanning circuit and the other path connected to the even area thereof.

A still further feature of the invention is means effective when either class (odd or even) digit is being scanned for preparing the next digit of opposite class for scanning.

Yet another feature of the invention is the provision of reversing relays effective upon operation to reverse the feeding paths from one scanning area to another whereby to compensate for the addition of arbitrary digits and/or the deletion of registered digits.

A full understanding of the arrangement contemplated by the invention, as well as an appreciation of the various features thereof, may be gained from consideration of the following detailed description in connection with the accompanying drawing, in which.

*General Description of Telephone System Including Frequency Shift Pulse Sender*

Figures 1, 7, 8:
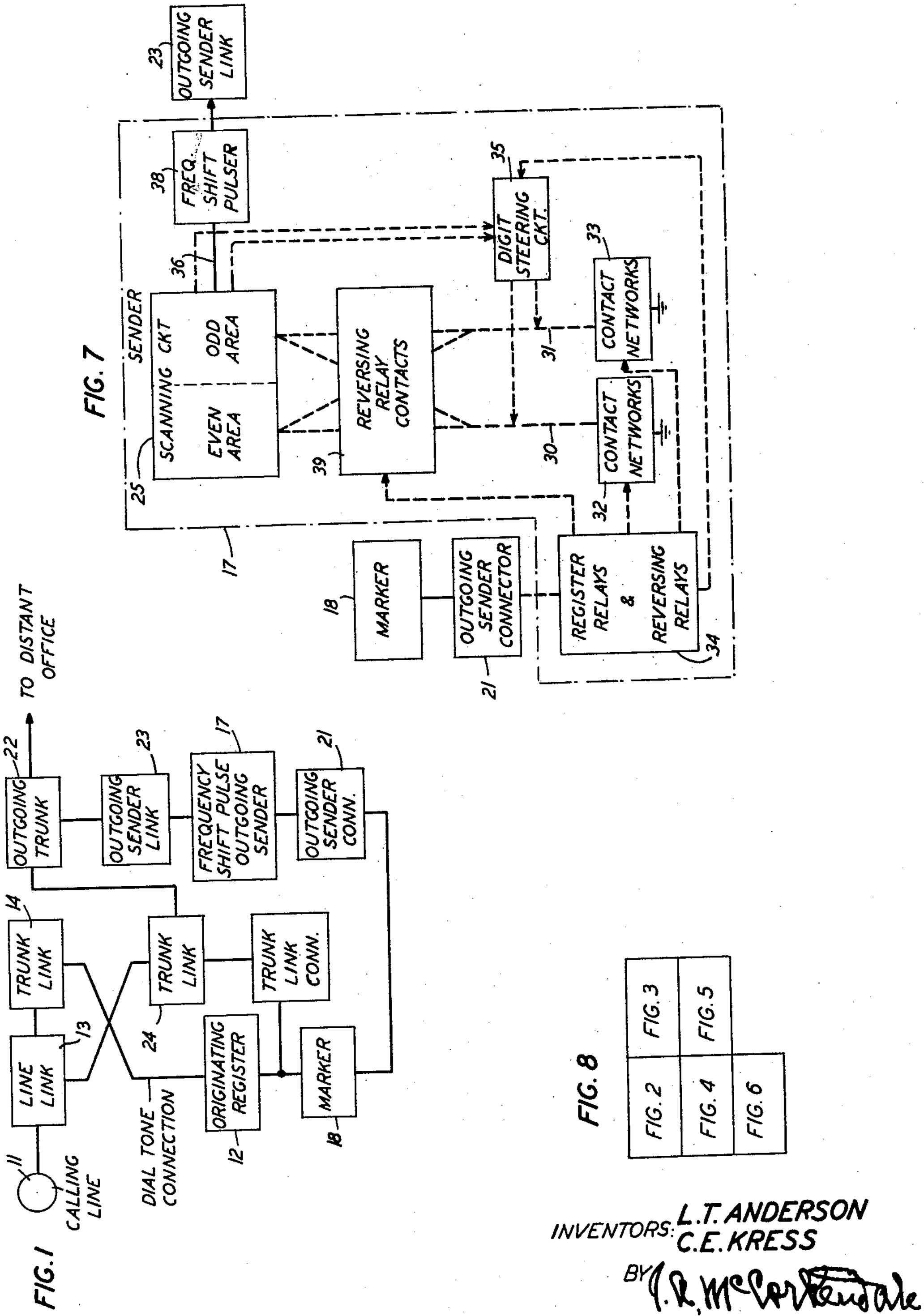
FIG. 1 shows schematically one way in which the frequency shift pulse outgoing sender contemplated by the present invention may be associated with other portions of an automatic telephone system.
FIG. 7 shows schematically the arrangement and relationship of the scanner, scanner feed paths and other elements of the sender in accordance with our invention and the immediately cooperating portions of the system.
FIG. 8 is a key diagram showing how FIGS. 2 through 6 should be joined together.

A general and a detailed description of the novel circuits included in the frequency shift pulse sender contemplated by the invention will be given subsequently with particular reference to FIG. 7 and FIGS. 2 to 6, respectively. However, there will first be given a brief general description of a type of system in connection with which the frequency shift pulse sender may be used. Referring to FIG. 1, therefore, calling line 11 is connected to originating register 12 by a dial-tone connection, as indicated, through the line link frame 13 and the trunk link frame 14. The subscriber after hearing dial-tone dials the area code, where required, the office code and the numerical digits into register 12. (The elements represented in FIG. 1 as associated with the contemplated frequency shift pulse sender 17 are well known in the art with regard both to arrangement and operation and will not be described in detail.)

When the entire number has been received, originating register 12 transfers it to marker 18 which translates the code and determines that the called office requires frequency shift pulses. Marker 18 then selects an idle frequency shift pulse sender (here assumed to be frequency shift pulse outgoing sender 17) with access to an outgoing trunk, and connects thereto by means of outgoing sender connector 21. Marker 18 also selects an idle outgoing trunk 22 and connects trunk 22 to sender 17 by means of outgoing sender link 23.

Outgoing sender connector 21 commonly consists of two channels, one a control channel which is individual to the sender and marker, and the other a common channel which is common to a group of senders and markers and which carries a majority of the connecting leads. Through the outgoing sender connector 21, the marker now transfers to frequency shift pulse sender 17 all the information necessary for the completion of the call. This information includes the dialed number, the number of digits to delete, the arbitrary digits to be prefixed, and the type of outgoing trunk. The marker also at this time causes a connection to be established between the calling line 11 and the outgoing trunk 22 through line link frame 13 and trunk link frame 24.

When marker 18 has checked the connection between the calling line and the outgoing trunk, the connection between the outgoing trunk and the sender, and has checked that sender 17 has received the correct information through outgoing sender connector 21, it transmits an "advance" (AV) signal to the sender through the control channel referred to above as an indication that sender 17 should assume supervision and complete the call.

As will be described in detail subsequently and shown generally in FIG. 7, frequency shift pulse sender 17 includes among its circuits, a digit registration circuit 34, a digit steering circuit 35, a scanning circuit 25 and a scanner feeding circuit including paths 30, 31 and associated contact networks 32, 33 and reversing relay contacts 39. The novel circuit arrangement contemplates "first order" and "second order" areas in the scanning circuit, which will be referred to, respectively, as the "even area" and the "odd area," with means for transmitting "odd" and "even" digits alternately to the respective areas. During an even scan the steering circuit guides the next odd digit to the odd digit scan, during the odd scan the next even digit is prepared, and so on. Reversing relay contacts 39 are included in the feeding paths 30, 31 which contacts upon operation reverse the feeding paths 30, 31 from one scanning area to another whereby to compensate for arbitrary digit addition or the deletion of digits and assure that each digit is steered to the proper respective scanning area.

After sender 17 has pulsed out all the digits registered, it transfers supervision to outgoing trunk 22 and releases. The call then progresses toward completion in the normal manner.

Since it is inherent in the sender operation that the system may operate in a number of ways, namely that no arbitrary digits may be added or that one, two or three arbitrary digits may be added, and that no registered digits may be deleted or that from one to six registered digits may be deleted, it will be readily apparent that a substantial number of combinations are possible. As just one example, a digit which is normally "odd," that is when there are no additions or deletions, may become "even" when there are an odd number of deletions, may again be "odd" when there are an even number of digits deleted and an even number of digits added, and so on. In order that the continuous scanning rate, which is attained by the provision of the odd-even areas and which is important in the proper functioning of the sender, may be maintained, it is necessary, of course, that the digits continue to be supplied on an alternate odd-even basis in spite of the additions or deletions introduced. Also it is necessary that the order of the registers be maintained, that it be added to, or that it be subtracted from according to the changes introduced, if any, by addition or deletion. Still further, changes in the locking paths of the steering relays must be made on occasion whereby the chain operation be maintained in accordance with which the operation of each relay of one order is followed by release of the previously-operated relay of that same order. All of these varying situations are successfully met by the novel arrangement contemplated by the invention.

*General Overall Description of Principal Portions of System Included in and Immediately Associated With Sender*

Figure 4:
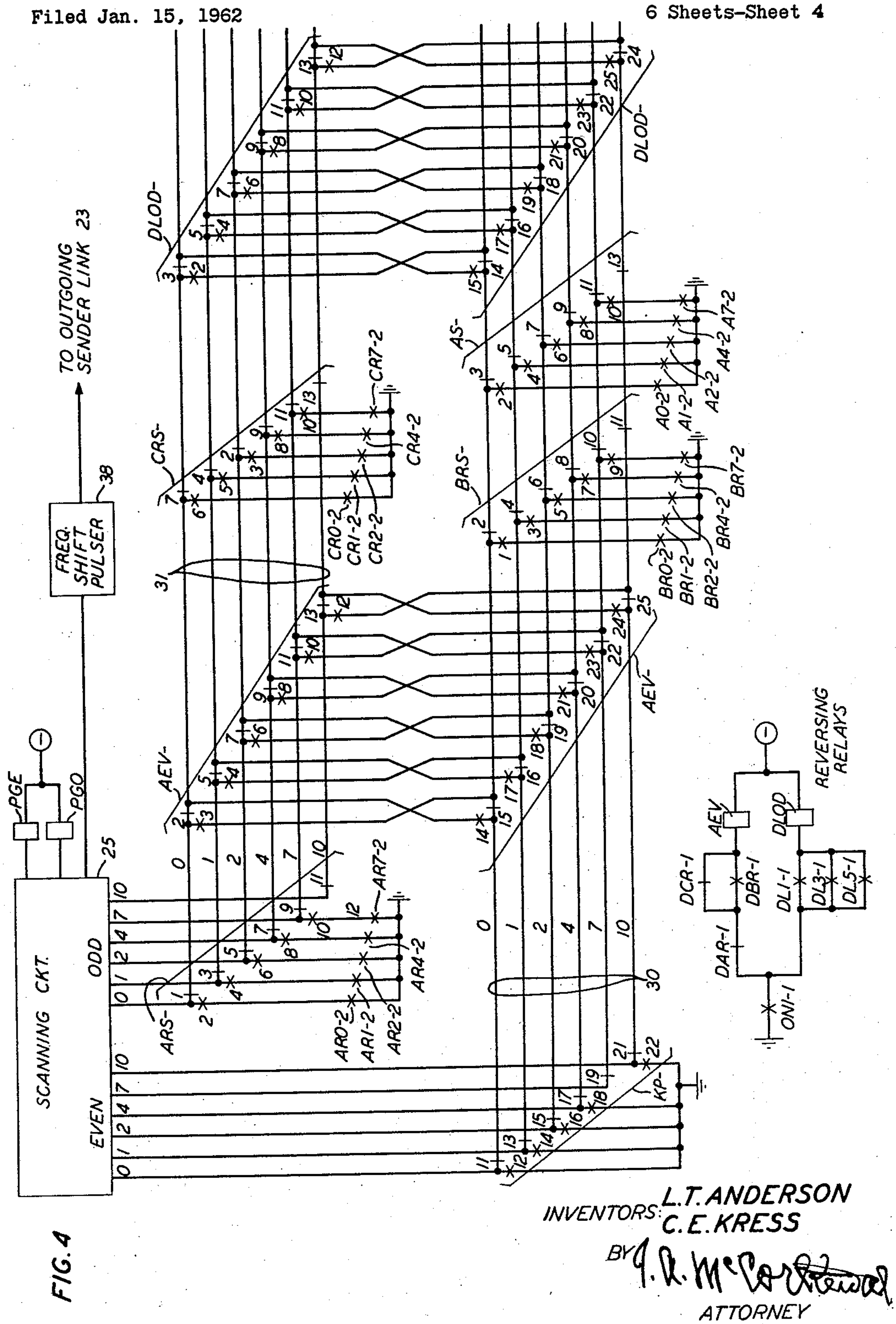
FIGS. 4 and 5 show the scanner feeding path of the sender.
Figure 5:
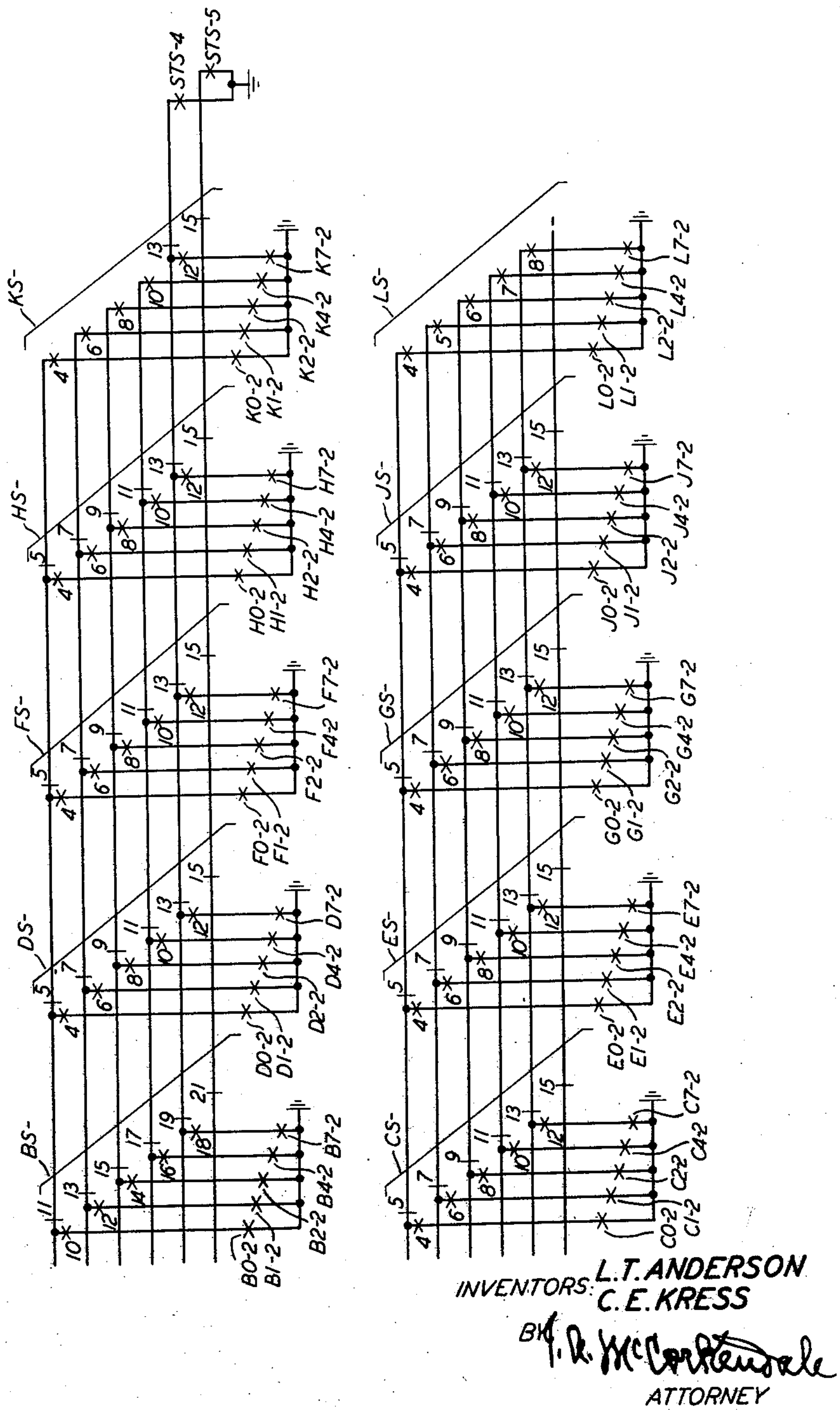
Figure 6:
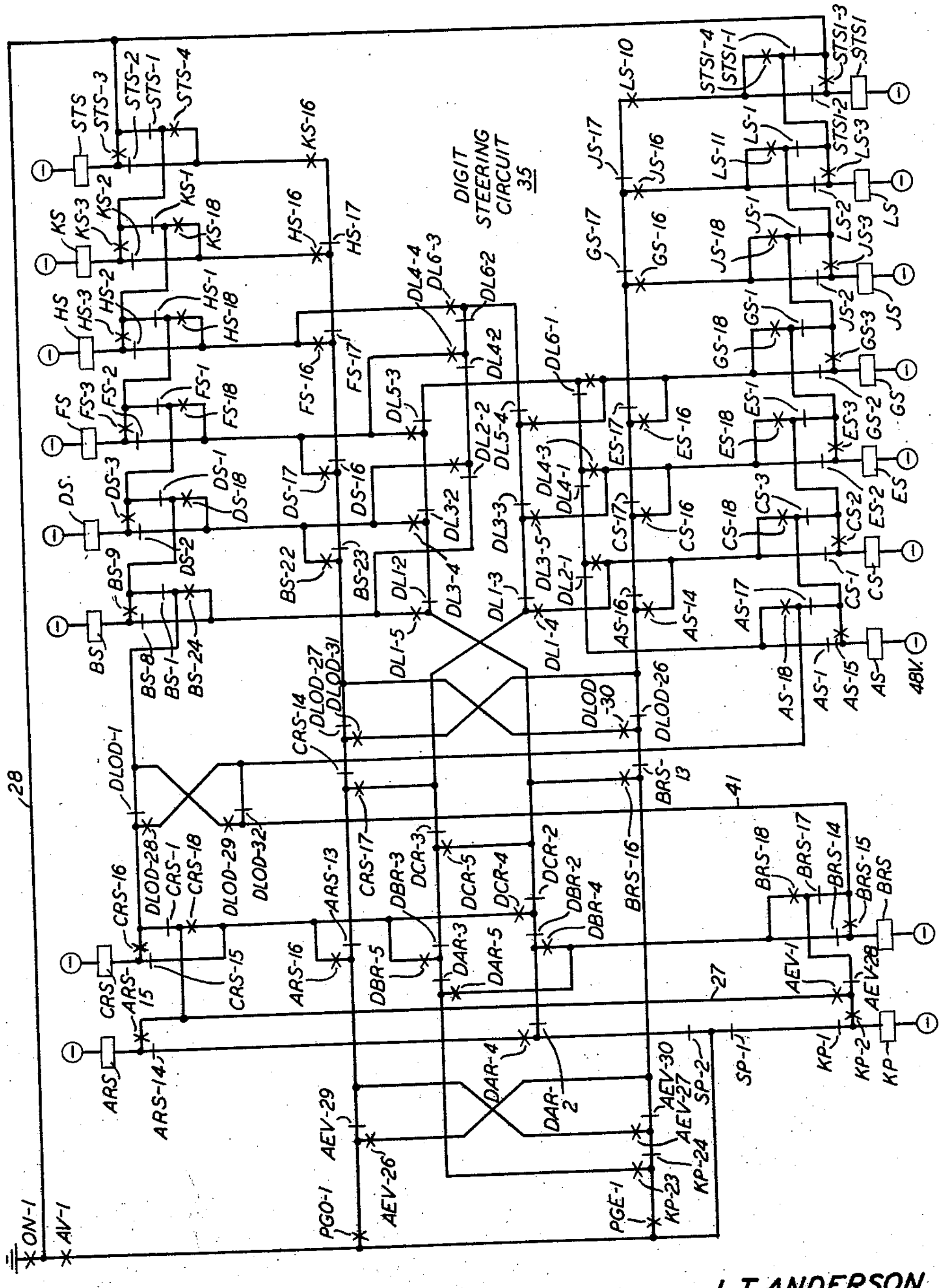
FIG. 6 shows the digit steering circuit.

It is believed that understanding of the subsequent detailed description of the frequency shift pulse sender 17 will be facilitated by first considering at this point a brief general description, with reference to FIG. 7, of certain portions of the system which are immediately associated with, or actually included in, the sender. Referring to FIG. 7, therefore, the scanning circuit 25 is indicated with its respective even and odd areas, the two respective feed paths or lines also being shown as paths 30 and 31. Actually paths 30 and 31, which will also be referred to herein as "lines," each comprise six "digit leads," 0, 1, 2, 4, 7 and 10, as described subsequently and as shown in FIGS. 4 and 5 of the drawing. The "information" supplied to the respective areas of the scanning circuit is in the nature of particular combinations of "grounds" or "opens" connected consecutively to the respective feed paths; these connections are determined in turn by the momentary condition (closed or released) of register relay contacts as represented in the drawing by captioned boxes 32 and 33. The condition of the register relay contacts is, of course, determined by the condition of the register relays themselves (captioned box 34); as will be described subsequently the register relays are conditionsd, i.e., operated or released, in accordance with the calling digit information stored in the digit registration circuit from the marker 18.

The paths 30 and 31 are activated in turn, under control of the digit steering circuit 35 (shown in detail in FIG. 6), to supply digit information, as determined by the register relays, to the respective even and odd areas of scanning circuit 25; the output from the scanner is applied over an output path 36 to control frequency shift pulser 38, the output of which, in turn, is supplied to outgoing sender link 23.

As indicated above, and as will be described in detail subsequently, it becomes necessary in the event of certain deletions of digits and/or certain additions of arbitrary digits to, in effect, temporarily reverse the connections of paths 30 and 31 to the respective areas of scanning circuit 25; in accordance with the novel arrangement contemplated by the present invention this reversal is accomplished through reversing relay contacts represented by captioned box 39. The reversing relays, similarly to the register relays and also represented by captioned box 34, are operated in accordance with information supplied by marker 18, specifically in accordance with delete and/or add instructions included in the calling information.

*Detailed Description of Frequency Shift Pulse Sender*

Figure 2:
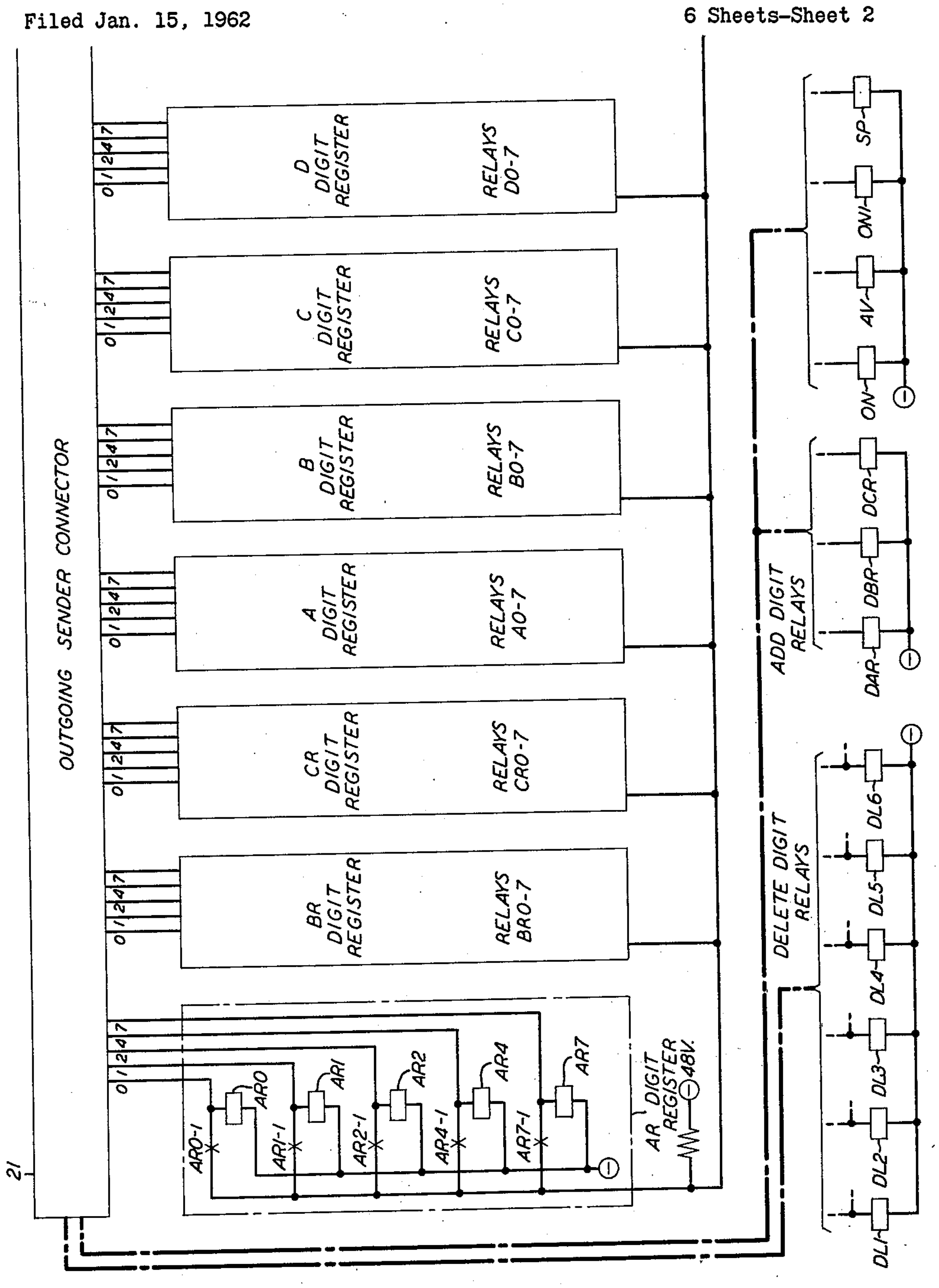
FIGS. 2 and 3 show the digit registration circuit of one specific illustrative embodiment of the frequency shift pulse outgoing sender contemplated by the invention.
Figure 3:
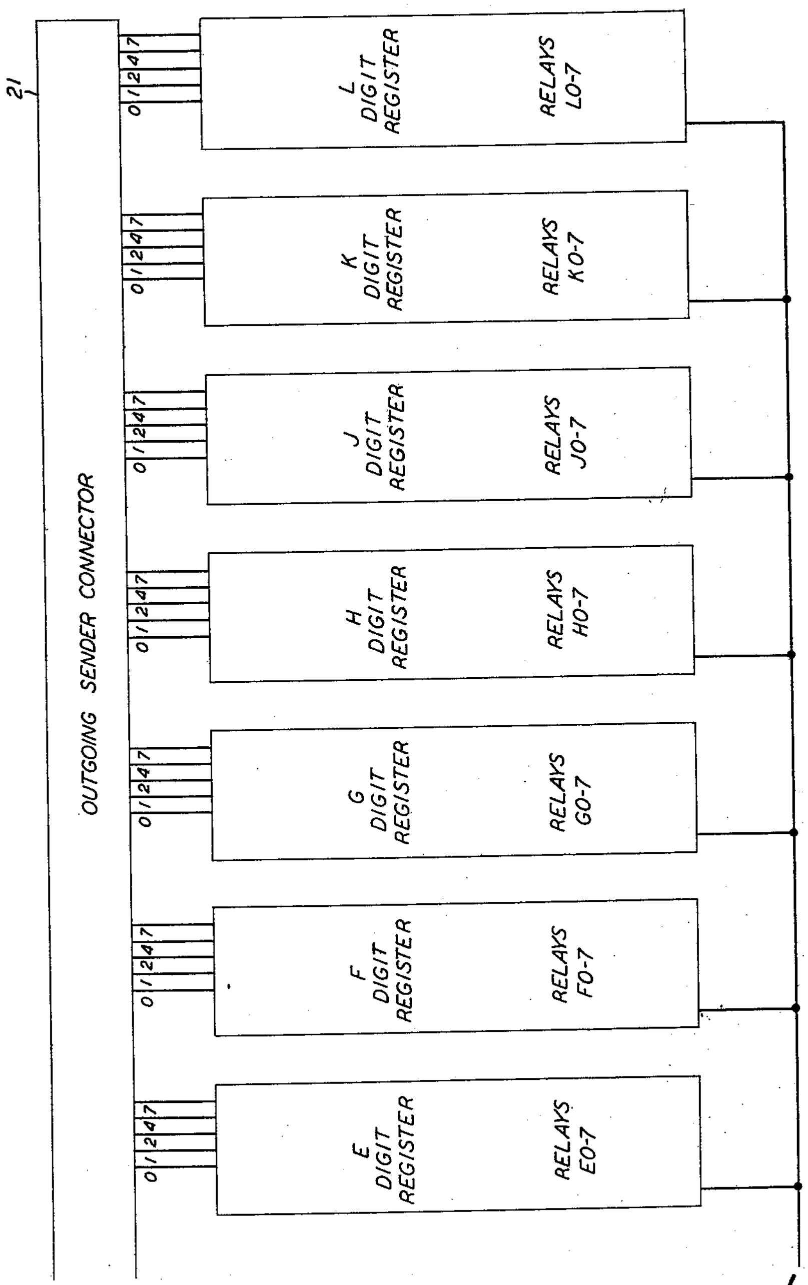

Referring now to the additional figures of the drawing, the digit registration circuit of frequency shift pulse outgoing sender 17 is shown in FIGS. 2 and 3; the digit registration circuit of FIGS. 2 and 3 together with the reversing relay circuit of FIG. 4 comprise the register and reversing relays 34 of FIG. 7. As pointed out above the information recorded in originating register 12 is transferred by the marker to the sender through outgoing sender connector 21; this information is recorded in the digit registration circuit in the same order as it was recorded in the originating register. The code and numerical digits are registered in the digit registration circuit on a two-out-of-five basis.

One of the digit register units, AR, is shown in detail in FIG. 2 and the other thirteen units, BR, CR, A, B, C, D, E, F, G, H, J, K and L are indicated by captioned boxes since all are alike in detail. Each unit comprises a suitable housing enclosing five dry-reed "register" relays; in the instance of the AR unit, for example, these relays are designated AR0, AR1, AR2, AR4, and AR7. Two of these relays will operate when an AR digit is registered. In addition to the registered information an extra signal is generated locally for KP and start purposes, and appears on the 10 lead of the feed paths 30 and 31, as described further below.

Provision is made in the sender for registering up to three arbitrary digits; as pointed out above these arbitrary digits originate in the marker and are commonly utilized for code conversion and code prefixing. Any digits registered on the arbitrary digit registers AR, BR, CR, will be transmitted ahead of digits registered on the A to L units. A single arbitrary digit will be registered on unit CR, two arbitrary digits will be registered on units CR and BR and three arbitrary digits will be registered on the AR, BR and CR units. In connection with these registrations, relay DCR is operated if one digit is added, relays DBR and DCR are operated if two digits are added and relays DAR, DBA and DCR are operated if three digits are added. As indicated by the dot-dash lines and brackets, operation of these relays is under control of paths of the registration circuit not shown in detail since the details of those paths are not directly involved in the present instance.

As also pointed out above, in many instances, particularly when direct trunks are available to the called office, the sender will be required to omit or delete some or all of the code digits. This is accomplished under control of delete signals from the marker through the outgoing sender connector 21 which, as indicated by the dot-dash lines and bracket, are applied to delete relays DL1 to DL6.

Relay AEV (add even), FIG. 4, will operate if an even number (0 or 2) of arbitrary digits are added and relay DLOD, FIG. 4 (delete odd), will operate if an odd number of digits are deleted; these two relays comprise the reversing relays of box 34 of FIG. 7. That is, if zero arbitrary digits are added, relay AEV operates through make contact ON1–1 and break contacts DAR–1 of relay DAR and DCR–1 of relay DCR while if two digits are added the operate path is through make contact ON1–1 of relay ON1, break contact DAR–1 of relay DAR, and make contact DBR–1 of relay DBR. If one (odd) arbitrary digit is added relay AEV remains in released, or nonoperated, position since the operate path is open at break contact DCR–1 of relay DCR. The respective operate paths for relay DLOD are completed through either make contact DL1–1 of relay DL1, DL3–1 of relay DL3 or DL5–1 of relay DL5. It will be apparent from FIG. 4 that contacts of relay AEV when operated reverse the feeding paths 30, 31 to the electronic scanning circuit 25 for all digits after AR; the locking path for relay KP (FIG. 6) is also reversed as subsequently described. It will also be apparent from FIGS. 4 and 5 that contacts of relay DLOD upon operating reverse the feeding paths 31, 30 for all steering relays after CRS; the locking paths for the KP relay and arbitrary digit steering relays are also reversed. In the schematic showing of FIG. 7 discussed above the reversing actions just referred to are performed by the "reversing relay contacts," box 39.

*No Arbitrary Digits Added; No Registered Digits Deleted*

It will be assumed now that the entire calling information has been recorded in the digit registration circuit, that no arbitrary digits have been added, no digits have been deleted, and that the "off-normal" relays ON and ON1 and the "advance" relay AV have been operated by the "advance" signal from the marker over the respective operate paths (not shown in detail). Relay AEV (FIG. 4) will be operated and relay DLOD (FIG. 4) will be in released position. Relay KP (FIG. 6) operates from ground, make contacts ON–1 of relay ON and AV–1 of relay AV, break contacts SP–1 of relay SP and KP–1 of relay KP, winding of relay KP to battery. (Relay SP, which it is noted is in released condition at this point, operates subsequently in connection with a trunk test function of the overall system, a function which is not immediately concerned with the sender circuit contemplated by the invention.) Relay KP upon operating locks to ground through its make contact KP–2, make contact AEV–1 of relay AEV, lead 27, break contacts CRS–1 of relay CRS, DLOD–1 of relay DLOD, BS–1 of relay BS, DS–1 of relay DS, FS–1 of relay FS, HS–1 of relay HS, KS–1 of relay KS, STS–1 on relays STS, lead 28, make contact ON–1 of relay ON to ground. Also at this time, since no arbitrary digits were added and no registered digits deleted, relay AS ("A" digit steering), FIG. 6, operates over a path from ground, make contacts ON–1 of relay ON and AV–1 of relay AV, break contacts SP–2 of relay SP, DAR–2 of relay DAR, DBR–2 of relay DBR, DCR–2 of relay DCR, DL1–2 of relay DL1, DL3–2 of relay DL3, DL5–3 of relay DL5, DL6–1 of relay DL6, DL4–1 of relay DL4, and DL2–1 of relay DL2, break contact AS–1 and winding of relay AS to battery; relay AS upon operating locks to ground through its make contact AS–15, break contacts CS–3 of relay CS, ES–1 of relay ES, GS–1 of relay GS, JS–1 of relay JS, LS–1 of relay LS, STS1–1 of relay STS1, lead 28, make contact ON–1 of relay ON to ground. Thus two relays (in this instance KP and AS) in the steering chains are operated before the steering and scanning actually begins.

Scanning circuit 25 is preferably of the electronic type with continuous series scanning of the even-odd areas; the circuit is not shown in detail since the exact arrangement is not essential in the present instance. A frequency shift pulser 38 is controlled by the scanning circuit output whereby to supply the mark-space signals to the line corresponding to the output-no output or on-off information supplied to the scanning circuit over the scanner feeding path. Relays PGE and PGO (FIG. 4) are also controlled by scanning circuit 25, relay PGE operating from an "even" scan and relay PGO operating from an "odd" scan.

Grounds permanently wired for the 5-of-6 start pulsing signal are immediately connected to the 0, 1, 2, 4 and 10 leads of path or line 30 and thus to the even area of the scanning circuit (FIG. 4) through make contacts KP–12, KP–14, KP–16, KP–18, and KP–22 of relay KP, the path toward the other steering relay contacts being opened at break contacts KP–11, KP–13, KP–15, KP–17, KP–19 and KP–21. At the same time the closed contacts of the A register relays A0, A1, A2, A4, and A7 (which contacts are contemplated as included in contact networks 32 of FIG. 7), for the first digit are connected through make contacts of the operated AS relay AS–2, AS–4, AS–6, AS–8, and AS–10, break contacts of the BRS relay, BRS–2, BRS–4, BRS–6, BRS–8, BRS–10 and BRS–11, make contacts of the AEV relay, AEV–3, AEV–4, AEV–6, AEV–8, AEV–10, and AEV–12, and break contacts of the ARS relay, ARS–1, ARS–3, ARS–5, ARS–7, ARS–9 and ARS–11. Thus the "information" to be supplied to the scanning circuit with regard to the A digit, that is the particular combination of "ground" and "opens," will be determined by the condition, operated or nonoperated, of the respective A register relays. (In the above and subsequent instances, contact designations common to a particular relay are indicated on the drawing by a single bracket.)

The first steering pulse is generated by the scanning circuit 25 (FIG. 4) during scanning of the KP pulse and triggering of shift pulser 38, and continued during the scanning interval of the digit which is long enough to operate the proper relay in the steering circuit. Since this is even pulse, relay PGE (FIG. 4) operates and the pulse is repeated over a path from ground, make contacts ON–1 of relay ON (FIG. 6), AV–1 of relay AV, PGE–1 of relay PGE and KP–23 of relay KP, break contacts DAR–3 of relay DAR, DBR–3 of relay DBR, DCR–3 of relay DCR, DL1–3 of relay DL1, DL3–3 of relay DL3, DL5–4 of relay DL5, DL6–2 of relay DL6, DL4–2 of relay DL4, DL2–2 of relay DL2, and BS–8 of relay BS, winding of relay BS to battery; relay BS operates over this path and locks to ground through a path including its make contact BS–9, break contacts DS–1 of relay DS, FS–1 of relay FS, HS–1 of relay HS, KS–1 of relay KS and STS–1 of relay STS, lead 28, and make contact ON–1 of relay ON to ground.

When relay BS (FIG. 6) operates, the previously-traced locking path of relay KP is interrupted at break contact BS–1 of relay BS but is immediately transferred to make contact BS–24 of the same relay and completed over a path through break contacts DL2–2 of relay DL2, DL4–2 of relay DL4, DL6–2 of relay DL6, DL5–4 of relay DL5, DL3–3 of relay DL3, DL1–3 of relay DL1, DCR–3 of relay DCR, DBR–3 of relay DBR, and DAR–3 of relay DAR, make contacts KP–23 of relay KP, PGE–1 of relay PGE, AV–1 of relay AV, and ON–1 of relay ON to ground.

Relay PGE releases at the end of the KP digit scanning cycle; release of the PGE relay is followed by release of the KP relay since the above-traced holding path is opened at make contact PGE–1 of relay PGE. The lines included in the previously-discussed path 30 are therefore closed to the even area of scanning circuit 25 (FIG. 4) through break contacts KP–11, KP–13, KP–15, KP–17, KP–19 and KP–21 of relay KP.

In the instance of the KP relay just discussed and of other steering relays discussed subsequently, it will be noted that, while a first locking path for the respective relay is interrupted by other relay operations, a second locking path is established immediately to hold the particular steering relay operated until the particular scan period has been completed and the respective PGE (even pulsing) or PGO (odd pulsing) relay has released. This operation assures proper pulse length.

As pointed out above the first odd pulse (register A) was connected to the odd scanning area through make contacts of the AS relay. (With reference to FIG. 7, previously discussed, register relay contacts involved in the connection would be included in contact networks 33 of that figure.) As previously pointed out, register A and the other registers not shown in detail are of the same general arrangement as that of the illustrated register AR, and it will be understood that relays A0, A1, A2, A4, and A7 of the A register correspond respectively to relays AR0, AR1, AR2, AR4, and AR7 (FIG. 2) of the AR register. The A digit, the first odd digit, is now scanned therefore and the second steering pulse is generated. Since this is an odd pulse, relay PGO (FIG. 4) operates and the pulse is repeated over a path from ground, make contacts ON–1 of relay ON (FIG. 6), AV–1 of relay AV, PGO–1 of relay PGO, and AEV–26 of relay AEV, break contacts BRS–13 of relay BRS, DLOD–26 of relay DLOD, make contact AS–14 of relay AS, break contact CS–1 of relay CS, and winding of relay CS to battery; relay CS operates and locks through its make contact CS–2, break contacts ES–1 of relay ES, GS–1 of relay GS, JS–1 of relay JS, LS–1 of relay LS, STS1–1 of relay STS1, lead 28, and make contact ON–1 of relay ON to ground.

When relay CS (FIG. 6) operates, the holding path previously traced for relay AS is interrupted at break contact CS–3 of relay CS but is immediately transferred to make contact CS–18 of relay CS and completed to ground through make contact AS–14 of relay AS, break contacts DLOD–26 of relay DLOD and BRS–13 of relay BRS, make contacts AEV–26 of relay AEV, PGO–1 of relay PGO, AV–1 of relay AV, and ON–1 of relay ON to ground.

Relay PGO releases at the end of the A digit scanning cycle and this is followed by release of relay AS since the above-traced locking path is interrupted at make contact PGO–1 of relay PGO.

The next even pulse (register B) having been connected to the even scanning area through operation of relay BS of the steering circuit (FIG. 6), which action corresponds to control of path 30 by the digit steering circuit 35, FIG. 7, operated contacts of the B register relay B0, B1, B2, B4, and B7 are connected through make contacts BS–10, BS–12, BS–14, BS–16, and BS–18 of relay BS, break contacts DLOD–3, DLOD–5, DLOD–7, DLOD–9, DLOD–11 and DLOD–13 of relay DLOD, break contacts CRS–7, CRS–4, CRS–2, CRS–9, CRS–11 and CRS–13 of relay CRS, make contacts AEV–14, AEV–17, AEV–18, AEV–21, AEV–23 and AEV–24 of relay AEV, and break contacts KP–11, KP–13, KP–15, KP–17, KP–19 and KP–21 of relay KP to the even area of the scanning circuit, and this even pulse is scanned. At this same time the next odd digit (C register) is connected to the odd scanning area through make contacts CS–4, CS–6, CS–8, CS–10, and CS–12 of relay CS, break contacts DLOD–14, DLOD–16, DLOD–18, DLOD–20, DLOD–22 and DLOD–24 of relay DLOD, break contacts AS–3, AS–5, AS–7, AS–9, AS–11, and AS–13 of relay AS, break contacts BRS–2, BRS–4, BRS–6, BRS–8, BRS–10 and BRS–11 of relay BRS, make contacts AEV–3, AEV–4, AEV–6, AEV–8, AEV–10, and AEV–12 of relay AEV, and break contacts ARS–1, ARS–3, ARS–5, ARS–7, ARS–9 and ARS–11 of relay ARS to the odd scanning area. This follows from operation of relay CS (FIG. 6) of the digit steeering circuit as described above and corresponds to activation of path 31 (FIG. 7) under control of digit steering circuit 35.

The next steering pulse is generated during scanning of the B digit and relay PGE (FIG. 4) operates. The even pulse is then repeated from ground, make contacts ON–1 of relay ON (FIG. 6), AV–1 of relay AV, PGE–1 of relay PGE, break contact KP–24 of relay KP, make contact AEV–27 of relay AEV, break contacts ARS–13 of relay ARS, CRS–14 of relay CRS, DLOD–27 of relay DLOD, make contact BS–22 of relay BS, break contact DS–2 and winding of relay DS to battery; relay DS operates over this path and locks to ground through its make contact DS–3 and break contacts FS–1 of relay FS, HS–1 of relay HS, KS–1 of relay KS, STS–1 of relay STS and over lead 28 to ground.

When relay DS (FIG. 6) operates, the previously-traced holding path of relay BS is interrupted at break contact DS–1 of relay DS. However, the holding path is immediately transferred to make contact DS–18 of relay DS and completed to ground through make contact BS–22 of relay BS, break contacts DLOD–27 of relay DLOD, CRS–14 of relay CRS, and ARS–13 of relay ARS, make contact AEV–27 of relay AEV, break contact KP–24 of relay KP, make contacts PGE–1 of relay PGE, AV–1 of relay AV and ON–1 of relay ON to ground.

Relay PGE (FIG. 4) releases at the end of the B digit scanning cycle and this is followed by release of relay BS since the above-traced holding path is interrupted at make contact PGE–1 of relay PGE.

Closed contacts of the D register relay group, D0–2, D1–2, D2–2, D4–2, and D7–2 (FIG. 5) representing the next even digit (and presumed to be included in "contact networks" 32 of FIG. 7) are now connected to the even area of the scanning circuit through make contacts DS–4, DS–6, DS–8, DS–10, and DS–12 of relay DS, break contacts BS–11, BS–13, BS–15, BS–17, BS–19, and BS–21 of relay BS, break contacts DLOD–3, DLOD–5, DLOD–7, DLOD–9, DLOD–11 and DLOD–13 of relay DLOD, break contacts CRS–7, CRS–4, CRS–2, CRS–9, CRS–11 and CRS–13 of relay CRS, make contacts AEV–14, AEV–17, AEV–18, AEV–21, AEV–23 and AEV–24 of relay AEV, and break contacts KP–11, KP–13, KP–15, KP–17, KP–19 and KP–21 of relay KP to the even area of the scanning circuit.

The odd pulse resulting from scanning the C register digit is repeated from ground, make contacts ON–1 of relay ON (FIG. 6), AV–1 of relay AV, PGO–1 of relay PGO, make contact AEV–26 of relay AEV, break contacts BRS–13 of relay BRS, DLOD–26 of relay DLOD, AS–16 of relay AS, make contact CS–16 of relay CS, break contact ES–2 and winding of relay ES to battery; relay ES operates over this path and locks to ground through its ES–3 make contact, break contacts GS–1 of relay GS, JS–1 of relay JS, LS–1 of relay LS, STS1–1 of relay STS1, lead 28 to ground.

When relay ES (FIG. 6) operates, the previously-traced holding path for relay CS is interrupted at break contact ES–1 of relay ES, but is immediately transferred to make contact ES–18 and completed to ground through make contacts CS–16 of relay CS, break contact AS–16 of relay AS, break contacts DLOD–26 of relay DLOD and BRS–13 of relay BRS, make contacts AEV–26 of relay AEV, PGO–1 of relay PGO, AV–1 of relay AV and ON–1 of relay ON.

Relay PGO releases at the end of the odd C digit scanning cycle; this is followed by release of relay CS since the above-traced holding path is interrupted at make contact PGO–1 of relay PGO.

Closed contacts of the E register relays E0, E1, E2, E4, and E7 (FIG. 5), representing the next odd digit and corresponding to contacts of contact network 33 (FIG. 7) are now connected to the odd scanning area through make contacts ES–4, ES–6, ES–8, ES–10, and ES–12 of relay ES, break contacts CS–5, CS–7, CS–9, CS–11, CS–13 and CS–15 of relay CS, break contacts DLOD–14, DLOD–16, DLOD–18, DLOD–20, DLOD–22 and DLOD–24 of relay DLOD, break contacts AS–3, AS–5, AS–7, AS–9, AS–11 and AS–13 of relay AS, break contact BRS–2, BRS–4, BRS–6, BRS–8, BRS–10, and BRS–11 of relay BRS, make contacts AEV–3, AEV–4, AEV–6, AEV–8, AEV–10 and AEV–12 of relay AEV and break contacts ARS–1, ARS–3, ARS–5, ARS–7, ARS–9, and ARS–11 of relay ARS to the odd scan area.

The even pulse resulting from scanning the D digit is repeated from ground, make contacts ON–1 of relay ON (FIG. 6), AV–1 of relay AV, PGE–1 of relay PGE, break contact KP–24 of relay KP, make contact AEV–27 of relay AEV, break contacts ARS–13 of relay ARS, CRS–14 of relay CRS, DLOD–27 of relay DLOD, BS–23 of relay BS, make contact DS–17 of relay DS, break contact FS–2 and winding of relay FS to battery; relay FS operates over this path and locks to ground through its FS–3 make contact and break contacts HS–1 of relay HS, KS–1 of relay KS and STS–1 of relay STS to lead 28.

When relay FS (FIG. 6) operates, the previously-traced holding path for relay DS is interrupted at break contact FS–1 of relay FS but is immediately transferred to make contact FS–18 and completed to ground through make contact DS–17 of relay DS, break contacts BS–23 of relay BS, DLOD–27 of relay DLOD, CRS–14 of relay CRS, and ARS–13 of relay ARS, make contact AEV–27 of relay AEV, break contact KP–24 of relay KP, make contacts PGE–1 of relay PGE, AV–1 of relay AV and ON–1 of relay ON.

Relay PGE releases at the end of the even D digit scanning cycle and this is followed by release of relay DS since the above-traced holding path is interrupted at make contact PGE–1 of relay PGE.

Closed contacts of the F register relays F0, F1, F2, F4, and F7 (FIG. 5), representing the next even digit of register F are now connected to the even area of the scanning circuit through make contacts FS–4, FS–6, FS–8, FS–10, and FS–12 of relay FS, break contacts DS–5, DS–7, DS–9, DS–11, DS–13 and DS–15 of relay DS, break contacts of relays BS, DLOD and CRS as previously described, make contacts AEV–14, AEV–17, AEV–18, AEV–21, AEV–23 and AEV–24 of relay AEV, break contacts KP–11, KP–13, KP–15, KP–17, KP–19 and KP–21 of relay KP to the even scanning area.

The odd pulse resulting from scan of the E register digit is repeated from ground, make contacts ON–1 of relay ON (FIG. 6), AV–1 of relay AV, PGO–1 of relay PGO, AEV–26 of relay AEV, break contacts BRS–13 of relay BRS, DLOD–26 of relay DLOD, AS–16 of relay AS, CS–17 of relay CS, make contact ES–16 of relay ES, break contact GS–2 and winding of relay GS to battery; relay GS operates and locks to ground through its make contact GS–3 and break contacts JS–1 of relay JS, LS–1 of relay LS and STS1–1 of relay STSL, lead 28, make contact ON–1 of relay ON to ground.

When relay GS operates the previously-traced locking path for relay ES is interrupted at break contact GS–1 of relay GS but is immediately transferred to make contact GS–18 and completed to ground through make contact ES–16 of relay ES, break contacts CS–17 of relay CS, AS–16 of relay AS, DLOD–26 of relay DLOD, and BRS–13 of relay BRS, make contacts AEV–26 of relay AEV, PGO–1 of relay PGO, AV–1 of relay AV and ON–1 of relay ON.

Relay PGO releases at the end of the odd digit scanning cycle and this is followed by release of relay ES since the above-described holding path is interrupted at make contact PGO–1 of relay PGO.

Closed contacts of G register relays G0, G1, G2, G4, and G7 (FIG. 5) are connected at this time to the odd scanning area through make contacts GS–4, GS–6, GS–8, GS–10, and GS–12, of relay GS, break contacts ES–5, ES–7, ES–9, ES–11, ES–13, ES–15 of relay ES, break contacts of relays CS, DLOD, AS and BRS relays as previously identified, make contacts AEV–3, AEV–4, AEV–6, AEV–8, AEV–10 and AEV–12 of relay AEV, break contacts of relay ARS as previously identified to the odd scanning area.

The even pulse resulting from scan of the F register digit is repeated from ground, make contacts ON–1 of relay ON (FIG. 6), AV–1 of relay AV, PGE–1 of relay PGE, break contact KP–24 of relay KP, make contact AEV–27 of relay AEV, break contacts ARS–13 of relay ARS, CRS–14 of relay CRS, DLOD–27 of relay DLOD, BS–23 of relay BS, DS–16 of relay DS, make contact FS–16 of relay FS, break contact HS–2 and winding of relay HS to battery; relay HS operates over this path and locks to ground through its own make contact HS–3, break contacts KS–1 of relay KS and STS–1 of relay STS to lead 28 and make contact ON–1 of relay ON to ground.

When relay HS (FIG. 6) operates the previously-traced locking path for relay FS is interrupted at break contact HS–1 of relay HS but is immediately transferrd to make contact HS–18 and completed to ground through make contact FS–16 of relay FS, break contacts DS–16 of relay DS, BS–23 of relay BS, DLOD–27 of relay DLOD, CRS–14 of relay CRS, and ARS–13 of relay ARS, make contact AEV–27 of relay AEV, break contact KP–24 of relay KP, make contact PGE–1 of relay PGE, AV–1 of relay AV and ON–1 of relay ON.

Relay PGE releases at the end of the even F digit scan cycle; this is followed by release of relay FS since the above-traced holding path is interrupted at make contact PGE–1 of relay PGE.

Closed contacts of H register relays H0, H1, H2, H4, and H7 (FIG. 5) are now connected to the even scan area through make contacts HS–4, HS–6, HS–8, HS–10, and HS–12 of relay HS, break contacts FS–5, FS–7, FS–9, FS–11, FS–13 and FS–15 of relay FS, break contacts of relays DS, BS, DLOD and CRS as previously identified, make contacts AEV–14, AEV–17, AEV–18, AEV–21, AEV–23 and AEV–24 of relay AEV, break contacts of relay KP as previously identified to the even scanning area.

The odd pulse resulting from scan of the G register digit is repeated from ground, make contacts ON–1 of relay ON (FIG. 6), AV–1 of relay AV, PGO–1 of relay PGO, make contact AEV–26 of relay AEV, break contacts BRS–13 of relay BRS, DLOD–26 of relay DLOD, AS–16 of relay AS, CS–17 of relay CS, ES–17 of relay ES, make contact GS–16 of relay GS, break contact JS–2 and winding of relay JS to battery; relay JS operates and locks to ground through its JS–3 make contact, break contacts LS–1 of relay LS and STS1–1 of relay STST1, lead 28 to ground.

When relay JS (FIG. 6) operates the previously-traced locking path for relay GS is interrupted at break contact JS–1, but is immediately transferred to make contact JS–18 and completed to ground through make contact GS–16 of relay GS, break contacts ES–17 of relay ES, CS–17 of relay CS, AS–16 of relay AS, DLOD–26 of relay DLOD, and BRS–13 of relay BRS, make contacts AEV–26 of relay AEV, PGO–1 of relay PGO, AV–1 of relay AV and ON–1 of relay ON.

Relay PGO releases at the end of the odd G digit scanning cycle and this is followed by release of relay GS since the above-traced holding path is interrupted at make contact PGO–1 of relay PGO.

Closed contacts of the J register relays J0, J1, J2, J4, and J7 (FIG. 5) are now connected to the odd scanning area through make contacts JS–4, JS–6, JS–8, JS–10, and JS–12 of relay JS, break contacts GS–5, GS–7, GS–9, GS–11, GS–13 and GS–15 of relay GS, break contacts of relays ES, CS, DLOD, AS, and BRS as previously identified, make contacts AEV–3, AEV–4, AEV–6, AEV–8, AEV–10 and AEV–12 of relay AEV, break contacts of relay ARS as previously identified to the odd scan area.

The even pulse resulting from scan of the H register digit is repeated from ground, make contacts ON–1 of relay ON (FIG. 6), AV–1 of relay AV, PGE–1 of relay PGE, break contact KP–24 of relay KP, make contact AEV–27 of relay AEV, break contacts ARS–13 of relay ARS, CRS–14 of relay CRS, DLOD–27 of relay DLOD, BS–23 of relay BS, DS–16 of relay DS, and FS–17 of relay FS, make contact HS–16 of relay HS, break contact KS–2 and winding of relay KS to battery; relay KS operates over this path and locks to ground through its make contact KS–3 and break contact STS–1 of relay STS to lead 28.

When relay KS (FIG. 6) operates the previously-traced holding path of relay HS is interrupted at break contact KS–1 but is immediately transferred to make contact KS–18 and completed to ground through make contact HS–16 of relay HS, break contacts FS–17 of relay FS, DS–16 of relay DS, BS–23 of relay BS, DLOD–27 of relay DLOD, CRS–14 of relay CRS, and ARS–13 of relay ARS, make contact AEV–27 of relay AEV, break contact KP–24 of relay KP, make contacts PGE–1 of relay PGE, AV–1 of relay AV and ON–1 of relay ON.

Relay PGE releases at the end of the even H digit scanning cycle and this is followed by release of relay HS since the above-traced holding path is interrupted at make contact PGE–1 of relay PGE.

Closed contacts of K register relays K0, K1, K2, K4, and K7 (FIG. 5) are now connected to the even scanning area through make contacts KS–4, KS–6, KS–8, KS–10, and KS–12 of relay KS, break contacts HS–5, HS–7, HS–9, HS–11, HS–13 and HS–15 of relay HS, break contacts of relays FS, DS, BS, DLOD and CRS as previously identified, make contacts AEV–14, AEV–17, AEV–18, AEV–21, AEV–23 and AEV–24 of relay AEV, break contacts of relay KP as previously identified to the even scanning area.

The odd pulse resulting from scan of the J register digit is repeated from ground, make contacts ON–1 of relay ON (FIG. 6), AV–1 of relay AV, PGO–1 of relay PGO, AEV–26 of relay AEV, break contacts BRS–13 of relay BRS, DLOD–26 of relay DLOD, AS–16 of relay AS, CS–17 of relay CS, ES–17 of relay ES, GS–17 of relay GS, make contact JS–16 of relay JS, break contact LS–2 and winding of relay LS to battery; relay LS operates over this path and locks to ground through its make contact LS–3, break contact STS1–1 of relay STS1 to lead 28.

When relay LS operates the previously-traced locking path for relay JS is interrupted at break contact LS–1 but is immediately transferred to make contact LS–11 and completed to ground through make contact JS–16 of relay JS, break contacts GS–17 of relay GS, ES–17 of relay ES, CS–17 of relay CS, AS–16 of relay AS, DLOD–26 of relay DLOD, and BRS–13 of relay BRS, make contacts AEV–26 of relay AEV, PGO–1 of relay PGO, AV–1 of relay AV and ON–1 of relay ON.

Relay PGO releases at the end of the odd J digit scanning cycle and this is followed by release of relay JS since the above-traced locking path is interrupted at make contact PGO–1 of relay PGO.

Closed contacts of the L register relays L0, L1, L2, L4, and L7 (FIG. 5) are now connected to the odd scan area through make contacts LS–4, LS–5, LS–6, LS–7, and LS–8 of relay LS, break contacts JS–5, JS–7, JS–9, JS–11, JS–13, JS–15 of relay JS, break contacts of relays GS, ES, CS, DLOD, AS and BRS as previously identified, make contacts AEV–3, AEV–4, AEV–6, AEV–8, AEV–10 and AEV–12 of relay AEV, break contacts of relay ARS as previously identified, odd area of scanning circuit.

The even pulse resulting from scan of the K register digit is repeated from ground, make contacts ON–1 of relay ON (FIG. 6), AV–1, of relay AV, PGE–1 of relay PGE, break contact KP–24 of relay KP, make contact AEV–27 of relay AEV, break contacts ARS–13 of relay ARS, CRS–14 of relay CRS, DLOD–27 of relay DLOD, BS–23 of relay BS, DS–16 of relay DS, FS–17 of relay FS, HS–17 of relay HS, make contact KS–16 of relay KS, break contact STS–2 and winding of relay STS to battery; relay STS operates over this path and locks to ground through its make contact STS–3 to lead 28.

When relay STS operates the previously-traced locking path for relay KS is interrupted at break contact STS–1 but is immediately transferred to make contact STS–4 and completed to ground through make contact KS–16 of relay KS, break contacts HS–17 of relay HS, FS–17 of relay FS, DS–16 of relay DS, BS–23 of relay BS, DLOD–27 of relay DLOD, CRS–14 of relay CRS and ARS–13 of relay ARS, make contact AEV–27 of relay AEV, break contact KP–24 of relay KP, make contacts PGE–1 of relay PGE, AV–1 of relay AV and ON–1 of relay ON.

Relay PGE releases at the end of the even digit K scan cycle and this is followed by release of relay KS since the above-traced holding path is interrupted at make contact PGE–1 of relay PGE.

Following operation of relay STS the 2-of-6 combination (7 and 10) is transmitted in the ST digit position as an end-of-digits signal. The path for connection of the two permanently wired ground connections is through make contacts STS–4 and STS–5 of relay STS (FIG. 5), break contacts KS–13 and KS–15 of relay KS, break contacts HS–13 and HS–15 of relay HS, break contacts FS–13 and FS–15 of relay FS, break contacts DS–13 and DS–15 of relay DS, break contacts BS–19 and BS–21 of relay BS, break contacts DLOD–11 and DLOD–13 of relay DLOD, and break contacts CRS–11 and CRS–13 of relay CRS, make contacts AEV–23 and AEV–24 of relay AEV, break contacts KP-19 and KP-21 of relay KP to the even scan area of scanning circuit 25.

The odd pulse resulting from scan of the L register digit is repeated from ground, make contacts ON-1 of relay ON (FIG. 6), AV-1 of relay AV, PGO-1 of relay PGO, AEV-26 of relay AEV, break contacts BRS-13 of relay BRS, DLOD-26 of relay DLOD, AS-16 of relay AS, CS-17 of relay CS, ES-17 of relay ES, GS-17 of relay GS, JS-17 of relay JS, make contact LS-10 of relay LS, break contact STS1-2 and winding of relay STS1 to battery; relay STS1 operates over this path and locks to ground through its STS1-3 make contact to lead 28.

When relay STS1 operates the previously-traced holding path for relay LS is interrupted at break contact STS1-1 but is immediately transferred to make contact STS1-4 and completed to ground through make contact LS-10 of relay LS, break contacts JS-17 of relay JS, GS-17 of relay GS, ES-17 of relay ES, CS-17 of relay CS, AS-16 of relay AS, DLOD-26 of relay DLOD, BRS-13 of relay BRS, make contacts AEV-26 of relay AEV, PGO-1 of relay PGO, AV-1 of relay AV and ON-1 of relay ON.

Relay PGO releases at the end of the odd digit L scan cycle and this is followed by release of relay LS since the above-traced holding path is interrupted at make contact PGO-1 of relay PGO.

Relays STS and STS1 release following release of relay ON and removal of ground from lead 28 and the steering circuit is then restored to normal.

It will be clear from the above description that a frequency shift pulse sender capable of high speed operation has been achieved because of the novel feeding arrangement whereby odd and even digits are fed respectively to series-connected odd and even areas of the scanning circuit, and wherein, while the odd digit is being scanned, the even digit is being connected to the scanning circuit and vice versa. Substantially continuous scanning is thus feasible. However, as pointed out above, addition of arbitrary digits and deletion of registered digits are inherent in the operation of the sender and, when the feeding circuit described above is utilized, these additions and deletions must be compensated for whereby to maintain proper steering of the digits. This follows from the obvious fact that addition of an odd number of digits or deletion of an odd number will "upset" the prearranged alternate distribution of the digits between the two feed paths. In accordance with another aspect of our invention a novel reversing circuit has been provided for this compensating purpose and will now be described.

*Two Arbitrary Digits Added; Three Registered Digits Deleted*

Let us assume now for purposes of further description, particularly with regard to the relay reversing arrangement, that in passing the calling information to the sender, two arbitrary digits have been added and three registered digits have been deleted. It will be recalled from the above description that relays DBR and DCR (FIG. 2) are operated when two arbitrary digits are added; relay AEV (FIG. 4) will be operated; therefore, assuming relay ON1 has operated, from ground, make contact ON1-1 of relay ON1, break contact DAR-1 of relay DAR, make contact DBR-1 of relay DBR, winding of relay AEV to battery. Also relay DLOD (FIG. 4) will be operated from ground, make contact ON1-1 of relay ON1, make contact DL3-1 of relay DL3, winding of relay DLOD to battery. At this time, therefore, relays AEV, DBR, DCR, DL3 and DLOD are operated. Relays AEV and DLOD are reversing relays with reversing relay contacts as represented by captioned box 39 (FIG. 7) and as discussed above in connection with FIG. 7.

Assuming that relays ON and AV have operated, relay KP (FIG. 6) operates from ground, make contacts ON-1 of relay ON and AV-1 of relay AV, break contact SP-1 of relay SP, break contact KP-1 and winding of relay KP to battery; relay KP upon operating locks to ground through its make contact KP-2, make contact AEV-1 of relay AEV, lead 27, break contact CRS-1 of relay CRS, make contact DLOD-28 of relay DLOD, break contacts AS-17 of relay AS, CS-3 of relay CS, ES-1 of relay ES, GS-1 of relay GS, JS-1 of relay JS, LS-1 of relay LS, STS1-1 of relay STS1 to lead 28. Also, at this same time relay BRS (FIG. 6) operates from ground, make contacts ON-1 of relay ON, AV-1 of relay AV, break contacts SP-2 of relay SP and DAR-2 of relay DAR, make contact DBR-4 of relay DBR, break contact BRS-14 and winding of relay BRS to battery; relay BRS upon operating locks to ground through its make contact BRS-15, lead 41, make contact DLOD-29 of relay DLOD, break contacts BS-1 of relay BS, DS-1 of relay DS, FS-1 of relay FS, HS-1 of relay HS, KS-1 of relay KS, STS-1 of relay STS to lead 28.

The KP register (FIG. 4) is immediately connected to the even scan area through make contacts KP-12, KP-14, KP-16, KP-18, and KP-22, therefore, while the closed contacts of the BR register relays BR0, BR1, BR2, BR4, and BR7 (the first odd digit) are connected to the odd scan area through make contacts BRS-1, BRS-3, BRS-5, BRS-7, and BRS-9 of relay BRS, make contacts AEV-3, AEV-4, AEV-6, AEV-8, AEV-10, AEV-12 of relay AEV, break contacts ARS-1, ARS-3, ARS-5, ARS-7, ARS-9, ARS-11 of relay ARS to the odd scan area.

The even pulse resulting from the scan of the KP register is repeated from ground, make contacts ON-1 of relay ON (FIG. 6), AV-1 of relay AV, PGE-1 of relay PGE, KP-23 of relay KP, break contact DAR-3 of relay DAR, make contact DBR-5 of relay DBR, break contact CRS-15 and winding of relay CRS to battery; relay CRS operates and locks to ground through its make contact CRS-16, make contact DLOD-28 of relay DLOD, break contacts AS-17 of relay AS, CS-3 of relay CS, ES-1 of relay ES, GS-1 of relay GS, JS-1 of relay JS, LS-1 of relay LS, STS1-1 of relay STS1 to lead 28.

When relay CRS operates the previously-described locking path for relay KP is interrupted at break contact CRS-1 but is immediately transferred to make contact CRS-18 and completed to ground through make contact DBR-5 of relay DBR, break contact DAR-3 of relay DAR, make contacts KP-23 of relay KP, PGE-1 of relay PGE, AV-1 of relay AV and ON-1 of relay ON.

Relay PGE (FIG. 4) releases at the end of the KP scan cycle and this is followed by release of relay KP since the above-traced locking path is interrupted at make contact PGE-1 of relay PGE.

Closed contacts of CR register relays CR0, CR1, CR2, CR4, and CR7 (FIG. 4) are now connected to the even scan area through make contacts CRS-6, CRS-5, CRS-3, CRS-8, and CRS-10 of relay CRS, make contacts AEV-14, AEV-17, AEV-18, AEV-21, AEV-23, and AEV-24 of relay AEV, break contacts KP-11, KP-13, KP-15, KP-17, KP-19 and KP-21 of relay KP, to even scan area.

The odd pulse resulting from the scan of the BR register is repeated from ground, make contacts ON-1 of relay ON (FIG. 6), AV-1 of relay AV, PGO-1 of relay PGO, AEV-26 of relay AEV, BRS-16 of relay BRS, break contact DL1-2 of relay DL1, make contact DL3-4 of relay DL3, break contact DS-2 and winding of relay DS to battery; relay DS operates and locks to ground through its DS-3 make contact, break contacts FS-1 of relay FS, HS-1 of relay HS, KS-1 of relay KS, and STS-1 of relay STS, lead 28, make contact ON-1 of relay ON to ground.

When relay DS operates, the previously-traced holding path for relay BRS is interrupted at break contact DS-1 but is immediately transferred to make contact DS-18 and completed to ground through make contact DL3-4 of relay DL3, break contact DL1-2 of relay DL1, make contacts BRS-16 of relay BRS, AEV-26 of relay AEV, PGO-1 of relay PGO, AV-1 of relay AV and ON-1 of relay ON.

Relay PGO releases at the end of the odd digit scanning cycle and this is followed by release of relay BRS since the above-described holding path is interrupted at make contact PGO-1 of relay PGO.

It will be observed that in view of the deletion of three registered digits, registers A, B and C (FIG. 2) have been bypassed and relay DS (FIG. 6) operated as above described. Also it will be recalled from the previous description that the D register relay contacts (FIG. 5), representing an even digit, are normally connected as previously described to the even area of the scanning circuit. However, in this instance, as just described, the previous register relay CRS is connected to the even area and it follows that if DS remained so connected a gap in the scanning would ensue. The novel reversing arrangement provided compensates for this situation and transfers the connection of the D register relay contacts to the odd scan area. This corresponds to a transfer of path 30 (FIG. 7) from the even area to the odd area under control of reversing relay contacts 39 as previously described. The path for accomplishing this connection is traced through make contacts DS-4, DS-6, DS-8, DS-10, and DS-12 (FIG. 5) of relay DS, break contacts BS-11, BS-13, BS-15, BS-17, BS-19 and BS-21 of relay BS, make contacts DLOD-15, DLOD-17, DLOD-19, DLOD-21, DLOD-23 and DLOD-25 of relay DLOD (FIG. 4), break contacts AS-3, AS-5, AS-7, AS-9, AS-11 and AS-13 of relay AS, break contacts BRS-2, BRS-4, BRS-6, BRS-8, BRS-10 and BRS-11 of relay BRS, make contacts AEV-3, AEV-4, AEV-6, AEV-8, AEV-10 and AEV-12 of relay AEV, break contacts ARS-1, ARS-3, ARS-5, ARS-7, ARS-9, and ARS-11 of relay ARS to the odd scan area.

The even pulse resulting from scan of the CR digit is repeated from ground, make contacts ON-1 of relay ON (FIG. 6), AV-1 of relay AV, PGE-1 of relay PGE, break contact KP-24 of relay KP, make contact AEV-27 of relay AEV, break contact ARS-13 of relay ARS, make contact CRS-17 of relay CRS, break contact DL1-3 of relay DL1, make contact DL3-5 of relay DL3, break contact ES-2 and winding of relay ES to battery; relay ES operates and locks to ground through its make contact ES-3, break contacts GS-1 of relay GS, JS-1 of relay JS, LS-1 of relay LS, STS1-1 of relay STS1, lead 28, make contact ON-1 of relay ON to ground.

When relay ES operates, the previously-described locking path for relay CRS is interrupted at break contact ES-1 but is immediately transferred to make contact ES-18 and completed to ground through make contact DL3-5 of relay DL3, break contact DL1-3 of relay DL1, make contact CRS-17 of relay CRS, break contact ARS-13 of relay ARS, make contact AEV-27 of relay AEV, break contact KP-24 of relay KP, make contacts PGE-1 of relay PGE, AV-1 of relay AV and ON-1 of relay ON.

Relay PGE (FIG. 4) releases at the end of the even digit CRS scanning cycle and this is followed by release of relay CRS since the above-described locking path is interrupted at make contact PGE-1 of relay PGE.

Here again it will be recalled from the previous description that the operated contacts of the E register relays are normally connected to the odd scan area. In this instance, however, since the last path from the DS relay was connected to the odd area it is necessary for purposes of continuous, rapid scanning that the ES relay be switched to the even scan area. This is accomplished by the novel reversing circuit of the present invention over a path from make contacts ES-4, ES-6, ES-8, ES-10, and ES-12 of relay ES (FIG. 5), break contacts CS-5, CS-7, CS-9, CS-11, CS-13 and CS-15 of relay CS, make contacts DLOD-2, DLOD-4, DLOD-6, DLOD-8, DLOD-10 and DLOD-12 of relay DLOD, break contacts CRS-7, CRS-4, CRS-2, CRS-9, CRS-11 and CRS-13 of relay CRS, make contacts AEV-14, AEV-17, AEV-18, AEV-21, AEV-23 and AEV-24 of relay AEV, break contacts KP-11, KP-13, KP-15, KP-17, KP-19 and KP-21 of relay KP to the even area of the scanning circuit.

The odd pulse resulting from scan of the D register digit is repeated from ground, make contacts ON-1 of relay ON (FIG. 6), AV-1 of relay AV, PGO-1 of relay PGO and AEV-26 of relay AEV, break contacts BRS-13 of relay BRS, make contact DLOD-30 of relay DLOD, break contact BS-23 of relay BS, make contact DS-17 of relay DS, break contact FS-2 and winding of relay FS to battery; relay FS operates and locks to ground on lead 28 through its make contact FS-3 and break contacts HS-1 of relay HS, KS-1 of relay KS and STS-1 of relay STS.

When relay FS operates, the previously-described holding path for relay DS is interrupted at break contact FS-1 but is immediately transferred to make contact FS-18 and completed to ground through make contact DS-17 of relay DS, break contact BS-23 of relay BS, make contact DLOD-30 of relay DLOD, break contact BRS-13 of relay BRS, make contacts AEV-26 of relay AEV, PGO-1 of relay PGO, AV-1 of relay AV, and ON-1 of relay ON.

Relay PGO releases at the end of the odd D digit scan cycle and this is followed by release of relay DS since the above-described holding path is interrupted at make contact PGO-1 of relay PGO.

Since the last previous connection (ES) was to the even scan area it is necessary to switch the FS connection from its normal path to the even area to the path leading to the odd scan area. This is accomplished over the path from make contacts FS-4, FS-6, FS-8, FS-10, and FS-12 of relay FS (FIG. 5), break contacts of relays DS and BS as previously identified, make contacts DLOD-15, DLOD-17, DLOD-19, DLOD-21, DLOD-23, and DLOD-25 of relay DLOD, break contacts of relays AS and BRS as previously identified, make contacts AEV-3, AEV-4, AEV-6, AEV-8, AEV-10, AEV-12 of relay AEV, break contacts of relay ARS as previously identified to the odd scan area.

The even pulse resulting from scan of the E register digit is repeated from ground, make contacts ON-1 of relay ON (FIG. 6), AV-1 of relay AV, PGE-1 of relay PGE, break contact KP-24 of relay KP, make contact AEV-27 of relay AEV, break contacts ARS-13 of relay ARS and CRS-14 of relay CRS, make contact DLOD-31 of relay DLOD, break contacts AS-16 of relay AS, CS-17 of relay CS, make contact ES-16 of relay ES, break contact GS-2 and winding of relay GS to battery; relay GS operates over this path and locks to ground on lead 28 through its make contact GS-3 and break contacts JS-1 of relay JS, LS-1 of relay LS and STS1-1 of relay STS1.

When relay GS operates, the previously-described locking path for relay ES is interrupted at break contact GS-1 but is immediately transferred to make contact GS-18 and completed to ground through make contact ES-16 of relay ES, break contacts CS-17 of relay CS, AS-16 of relay AS, make contact DLOD-31 of relay DLOD, break contacts CRS-14 of relay CRS and ARS-13 of relay ARS, make contact AEV-27 of relay AEV, break contact KP-24 of relay KP, make contacts PGE-1 of relay PGE, AV-1 of relay AV and ON-1 of relay ON.

Relay PGE releases at the end of the even E digit scanning cycle and this is followed by release of relay ES since the above-described holding path is interrupted at make contact PGE-1 of relay PGE.

The closed contacts (FIG. 5) of the G register relays are now switched from their normal connection to the odd scan area to the even scan area over a path from make contacts GS-4, GS-6, GS-8, GS-10, and GS-12 of relay GS, break contacts of relays ES and CS as previously identified, make contacts DLOD-2, DLOD-4, DLOD-6, DLOD-8, DLOD-10 and DLOD-12 of relay DLOD, break contacts of relay CRS as previously identified, make contacts AEV-14, AEV-17, AEV-18, AEV- 21, AEV–23, and AEV–24 of relay AEV, break contacts of relay KP as previously identified to the even scan area.

The circuit operates in a similar manner for scanning the remaining registers and restores to normal upon completion of the cycle as described above. It will be clear that by means of the novel relay reversing circuit provided the digits are automatically switched between the even and odd paths in a manner to maintain continuous scanning with proper alternating of connections between odd and even areas even though the normal conection plan is interfered with by the deletion of the three digits. Also the various locking paths for the steering relays are reversed as required and steering relays are bypassed and additional steering relays are operated as required by the addition and deletion of digits.

*One Arbitrary Digit Added; One Registered Digit Deleted*

For purposes of further description let it be assumed now that a single arbitrary digit be added and that a single registered digit be deleted. In this case relays DCR, DL1 (FIG. 2) and DLOD (FIG. 4) will be operated while relays DAR, DBR and AEV will be normal, or released. At the start of the cycle relay KP (FIG. 6) operates, as described above, and in this instance locks to ground through its make contact KP–2, break contact AEV–28 of relay AEV, break contact BRS–17 of relay BRS, make contact DLOD–29 of relay DLOD, break contacts BS–1 of relay BS, DS–1 of relay DS, FS–1 of relay FS, HS–1 of relay HS, KS–1 of relay KS and STS–1 of relay STS to lead 28. At the same time relay CRS operates from ground, make contacts ON–1 of relay ON, AV–1 of relay AV, break contact SP–2 of relay SP, break contacts DAR–2 of relay DAR and DBR–2 of relay DBR, make contact DCR–4 of relay DCR, break contact CRS–15 and winding of relay CRS to battery; relay CRS upon operating locks to ground on lead 28 through its make contact CRS–16, make contact DLOD–28 of relay DLOD, break contacts AS–17 of relay AS, CS–3 of relay CS, ES–1 of relay ES, GS–1 of relay GS, JS–1 of relay JS, LS–1 of relay LS and STS1–1 of relay STS1.

At this time, therefore, the permanent ground on the 0, 1, 2, 4, and 10 leads is connected through the contacts of the KP relay and the path 30 to the even scan area and the closed contacts of CR register relays CR0, CR1, CR2, CR4, and CR7 are connected to the odd scan area through make contacts CRS–6, CRS–5, CRS–3, CRS–8, and CRS–10 of relay CRS, break contacts AEV–2, AEV–5, AEV–7, AEV–9, AEV–11 and AEV–13 of relay AEV, break contacts ARS–1, ARS–3, ARS–5, ARS–7, ARS–9, ARS–11 of relay ARS to the odd scan area.

The even pulse resulting from scan of the KP digit is repeated from ground, make contacts ON–1 of relay ON (FIG. 6), AV–1 of relay AV, PGE–1 of relay PGE, make contact KP–23 of relay KP, break contacts DAR–3 of relay DAR and DBR–3 of relay DBR, make contact DCR–5 of relay DCR, make contact DL1–5 of relay DL1, break contact BS–8 and winding of relay BS to battery; relay BS operates over this path and locks to ground through its make contact BS–9, and break contacts DS–1 of relay DS, FS–1 of relay FS, HS–1 of relay HS, KS–1 of relay KS, and STS–1 of relay STS to lead 28.

When relay BS operates, the previously-described locking path for relay KP is interrupted at break contact BS–1 but is immediately transferred to make contact BS–24 and completed to ground through make contacts DL1–5 of relay DL1 and DCR–5 of relay DCR, break contacts DBR–3 of relay DBR and DAR–3 of relay DAR, make contacts KP–23 of relay KP, PGE–1 of relay PGE, AV–1 of relay AV and ON–1 of relay ON.

Relay PGE releases at the end of the KP scan and this is followed by release of relay KP since the above-described holding path is interrupted at make contact PGE–1 of relay PGE.

Since the last previous connection (CRS) was to the odd scan area, the B register relay contacts should be connected to the even scan area. This is accomplished over a path through make contacts BS–10, BS–12, BS–14, BS–16, and BS–18 (FIG. 5) of relay BS, make contacts DLOD–15, DLOD–17, DLOD–19, DLOD–21, DLOD–23 and DLOD–25 of relay DLOD, break contacts of relays AS and BRS as previously identified, break contacts AEV–15, AEV–16, AEV–19, AEV–20, AEV–22 and AEV–25 of relay AEV, break contacts KP–11, KP–13, KP–15, KP–17, KP–19 and KP–21 of relay KP to the even scan area.

The odd pulse resulting from the CR scan is repeated from ground, make contacts ON–1 of relay ON (FIG. 6), AV–1 of relay AV, PGO–1 of relay PGO, break contacts AEV–29 of relay AEV, and ARS–13 of relay ARS, make contacts CRS–17 of relay CRS, make contact DL1–4 of relay DL1, break contact CS–1 and winding of relay CS to battery. Relay CS operates over this path and locks to ground over its make contact CS–2 and break contacts ES–1 of relay ES, GS–1 of relay GS, JS–1 of relay JS, LS–1 of relay LS and STS1–1 of relay STS1 to lead 28.

When relay CS operates, the previously-described holding path for relay CRS is interrupted at break contact CS–3 but is immediately transferred to make contact CS–18 and completed to ground through make contacts DL1–4 of relay DL1 and CRS–17 of relay CRS, break contacts ARS–13 of relay ARS and AEV–29 of relay AEV, make contacts PGO–1 of relay PGO, AV–1 of relay AV and ON–1 of relay ON.

Relay PGO releases at the end of the odd digit scanning cycle and this is followed by release of relay CRS since the above-described holding path is interrupted at make contact PGO–1 of relay PGO.

Since the last connection (BS) was to the even scan area, the C register relay contacts should be connected to the odd scan area. This is accomplished over a path from make contacts CS–4, CS–6, CS–8, CS–10, and CS–12 (FIG. 5) of relay CS, make contacts DLOD–2, DLOD–4, DLOD–6, DLOD–8, DLOD–10 and DLOD–12 of relay DLOD, and break contacts of relays CRS, AEV and ARS as previously identified to the odd scan area.

The even pulse resulting from the BS scan is repeated from ground, make contacts ON–1 of relay ON (FIG. 6), AV–1 of relay AV, PGE–1 of relay PGE, break contacts KP–24 of relay KP, AEV–30 of relay AEV, BRS–13 of relay BRS, make contacts DLOD–30 of relay DLOD and BS–22 of relay BS, break contact DS–2 and winding of relay DS to battery. Relay DS operates and locks to ground through its make contact DS–3 and break contacts FS–1 of relay FS, HS–1 of relay HS, KS–1 of relay KS, and STS–1 of relay STS to lead 28.

When relay DS operates, the previously-described holding path for relay BS is interrupted at break contact DS–1 but is immediately transferred to make contact DS–18 and completed to ground through make contact BS–22 of relay BS, make contact DLOD–30 of relay DLOD, break contacts BRS–13 of relay BRS, AEV–30 of relay AEV and KP–24 of relay KP, make contacts PGE–1 of relay PGE, AV–1 of relay AV and ON–1 of relay ON.

Relay PGE releases at the end of the even digit scanning cycle and this is followed by release of relay BS since the above-described locking path is interrupted at make contact PGE–1 of relay PGE.

The operated contacts of the D register relays D0, D1, D2, D4, and D7 are connected to the even scan area through make contacts DS–4, DS–6, DS–8, DS–10, and DS–12 (FIG. 5) of relay DS, break contacts of relay BS as previously identified, make contacts DLOD–15, DLOD–17, DLOD–19, DLOD–21, DLOD–23 and DLOD–25 of relay DLOD, break contacts of relays AS and BRS as previously identified, break contacts AEV–15, AEV–16, AEV–19, AEV–20, AEV–22 and AEV–25 of relay AEV, break contacts of relay KP as previously identified, to the even scan area.

The remaining register relay contacts are connected in turn for scanning in the manner described, and it will be noted that each register is connected for scanning in the proper alternate odd-even manner even though both arbitrary addition and digit deletion has been effected.

*Three Arbitrary Digits Added; Four Registered Digits Deleted*

As a still further illustrative example it will be assumed that in passing the calling information to the sender from the marker three arbitrary digits are added and four registered digits are deleted. In this instance relays DBR, DAR, DCR, DL4 (FIG. 2) will be operated while relays AEV and DLOD (FIG. 4) are both released.

The KP relay (FIG. 6) operates over the path previously described but in this instance locks to ground through its make contact KP–2, break contacts AEV–28 of relay AEV, BRS–17 of relay BRS, DLOD–32 of relay DLOD, AS–17 of relay AS, CS–3 of relay CS, ES–1 of relay ES, GS–1 of relay GS, JS–1 of relay JS, LS–1 of relay LS, STS1–1 of relay STS1, lead 28, make contact ON–1 of relay ON to ground. Also, relay ARS (FIG. 6) operates at this time from ground, make contacts ON–1 of relay ON and AV–1 of relay AV, break contact SP–2 of relay SP, make contact DAR–4 of relay DAR, break contact ARS–14 and winding of relay ARS to battery. Relay ARS, upon operating, locks to ground through its ARS–15 make contact, break contacts CRS–1 of relay CRS, DLOD–1 of relay DLOD, BS–1 of relay BS, DS–1 of relay DS, FS–1 of relay FS, HS–1 of relay HS, KS–1 of relay KS, and STS–1 of relay STS, lead 28, make contact ON–1 of relay ON to ground.

Grounds representing the permanently connected KP digits are, as before, connected to the even scan area through make contacts (FIG. 4) of the KP relay as previously identified, while closed contacts of the AR register relays AR0, AR1, AR2, AR4, and AR7 are connected through make contacts ARS–2, ARS–4, ARS–6, ARS–8, and ARS–10 of relay ARS to the odd area of the scanning circuit for subsequent scan.

The even pulse resulting from the KP scan is repeated from ground, make contacts ON–1 of relay ON (FIG. 6), AV–1 of relay AV, PGE–1 of relay PGE, KP–23 of relay KP, and DAR–5 of relay DAR, break contact BRS–14 and winding of relay BRS to battery. Relay BRS operates over this path and locks to ground through its make contact BRS–15, break contacts DLOD–32 of relay DLOD, AS–17 of relay AS, CS–3 of relay CS, ES–1 of relay ES, GS–1 of relay GS, JS–1 of relay JS, LS–1 of relay LS and STS1–1 of relay STS1, lead 28, make contact ON–1 of relay ON to ground.

When relay BR operates, the previously-traced locking path for relay KP is interrupted at break contact BRS–17 but is immediately transferred to make contact BRS–18 and completed to ground through make contacts DAR–5 of relay DAR, KP–23 of relay KP, PGE–1 of relay PGE, AV–1 of relay AV and ON–1 of relay ON.

Relay PGE releases at the end of the even KP scan cycle and this is followed by release of relay KP since the above-described locking path is interrupted at make contact PGE–1 of relay PGE.

Since the last previous register connection (ARS) was to the odd scan area, the BR register relay contacts should, of course, be connected to the even area. This connection is accomplished through make contacts BRS–1, BRS–3, BRS–5, BRS–7, and BRS–9 (FIG. 4) of relay BRS, break contacts AEV–15, AEV–16, AEV–19, AEV–20, AEV–22 and AEV–25 of relay AEV, break contacts of relay KP as previously identified to the even scan area.

The odd pulse resulting from the AR scan is repeated from ground, make contacts ON–1 of relay ON (FIG. 6), AV–1 of relay AV and PGO–1 of relay PGO, break contact AEV–29 of relay AEV, make contact ARS–16 of relay ARS, break contact CRS–15 and winding of relay CRS to battery; relay CRS operates over this path and locks to ground through its make contacts CRS–16 and break contacts DLOD–1 of relay DLOD, BS–1 of relay BS, DS–1 of relay DS, FS–1 of relay FS, HS–1 of relay HS, KS–1 of relay KS and STS–1 of relay STS, lead 28 to ground on make contact ON–1 of relay ON.

When relay CRS operates the previously-traced holding path for relay ARS is interrupted at break contact CRS–1 but is immediately transferred to make contact CRS–18 and completed to ground through make contact ARS–16 of relay ARS, break contact AEV–29 of relay AEV, make contacts PGO–1 of relay PGO, AV–1 of relay AV and ON–1 of relay ON.

Relay PFO releases at the end of the odd digit AR scan cycle and this is followed by release of relay ARS since the above-traced holding path is interrupted at make contact PGO–1 of relay PGO.

The closed contacts of the CR register relays CR0, CR1, CR2, CR4, and CR7 are connected at this time to the odd scan area through make contacts CRS–6, CRS–5, CRS–3, CRS–8, and CRS–10 (FIG. 4) of relay CRS, break contacts AEV–2, AEV–5, AEV–7, AEV–9, AEV–11 and AEV–13 of relay AEV, break contacts of relay ARS as previously identified to the odd scan area.

The even pulse resulting from the BR scan is repeated from ground, make contacts ON–1 of relay ON (FIG. 6), AV–1 of relay AV, PGE–1 of relay PGE, break contacts KP–24 of relay KP, and AEV–30 of relay AEV, make contact BRS–16 of relay BRS, break contacts DL1–2 of relay DL1, DL3–2 of relay DL3, DL5–3 of relay DL5 and DL6–1 of relay DL6, make contact DL4–3 of relay DL4, break contact ES–2 and winding of relay ES to battery; relay ES operates over this path (it will be recalled that four digits were deleted) and locks to ground through its ES–3 make contact and break contacts GS–1 of relay GS, JS–1 of relay JS, LS–1 of relay LS and STS1–1 of relay STS1 to lead 28.

When relay ES operates the previously-traced holding path for relay BRS is interrupted at break contact ES–1 but is immediately transferred to make contact ES–18 and completed to ground through make contact DL4–3 of relay DL4, break contacts DL6–1 of relay DL6, DL5–3 of relay DL5, DL3–2 of relay DL3, and DL1–2 of relay DL1, make contact BRS–16 of relay BRS, break contacts AEV–30 of relay AEV and KP–24 of relay KP, make contacts PGE–1 of relay PGE, AV–1 of relay AV and ON–1 of relay ON.

Relay PGE releases at the end of the even digit scan cycle and this is followed by release of relay BRS since the above-described locking path is interrupted at make contact PGE–1 of relay PGE.

The closed contacts of the E register relays E0, E1, E2, E4, and E7 are connected to the even scan area through make contacts ES–4, ES–6, ES–8, ES–10 and ES–12 (FIG. 5) of relay ES, break contacts of relay CS as previously identified, break contacts DLOD–14, DLOD–16, DLOD–18, DLOD–20, DLOD–22, and DLOD–24 of relay DLOD, break contacts of relays AS and BRS as previously identified, break contacts AEV–15, AEV–16, AEV–19, AEV–20, AEV–22 and AEV–25 of relay AEV, break contacts of relay KP as previously identified to the even scan area.

The odd pulse resulting from the CR register scan is repeated from ground, make contacts ON–1 of relay ON (FIG. 6), AV–1 of relay AV, PGO–1 of relay PGO, break contacts AEV–29 of relay AEV, ARS–13 of relay ARS, make contact CRS–17 of relay CRS, break contacts DL1–3 of relay DL1, DL3–3 of relay DL3, DL5–4 of relay DL5, and DL6–2 of relay DL6, make contact DL4–4 of relay DL4, break contact FS–2 and winding of relay FS to battery; relay FS operates and locks to ground through its FS–3 make contact and break contacts HS–1 of relay HS, KS–1 of relay KS and STS–1 of relay STS to lead 28.

When relay FS operates the previously-described locking path for relay CRS is interrupted at break contact FS–1 but is immediately transferred to make contact FS–18 and completed to ground through make contact DL4–4 of relay DL4, break contacts DL6–2 of relay DL6, DL5–4 of relay DL5, DL3–3 of relay DL3, and DL1–3 of relay DL1, make contact CRS–17 of relay CRS, break contacts ARS–13 of relay ARS and AEV–29 of relay AEV, make contacts PGO–1 of relay PGO, AV–1 of relay AV and ON–1 of relay ON.

Relay PGO releases at the end of the odd digit scanning cycle and this is followed by release of relay CRS since the above-described holding path is interrupted at make contact PGO–1 of relay PGO.

The closed contacts of the F register relays F0, F1, F2, F4, and F7 are connected to the odd scan area through make contacts FS–4, FS–6, FS–8, FS–10, and FS–12 (FIG. 5) of relay FS, break contacts of relays DS and BS as previously identified, break contacts DLOD–3, DLOD–5, DLOD–7, DLOD–9, DLOD–11 and DLOD–13 of relay DLOD, break contacts of relay CRS as previously identified, break contacts AEV–2, AEV–5, AEV–7, AEV–9, AEV–11 and AEV–13 of relay AEV, break contacts of relay ARS as previously identified to the odd scan area.

The even pulse resulting from the E register scan is repeated from ground, make contacts ON–1 of relay ON (FIG. 6), AV–1 of relay AV, PGE–1 of relay PGE, break contacts KP–24 of relay KP, AEV–30 of relay AEV, BRS–13 of relay BRS, DLOD–26 of relay DLOD, AS–16 of relay AS, and CS–17 of relay CS, make contact ES–16 of relay ES, break contact GS–2 and winding of relay GS to battery; relay GS operates over this path and locks to ground through its make contact GS–3 and break contacts JS–1 of relay JS, LS–1 of relay LS and STS1–1 of relay STS1 to lead 28.

When relay GS operates, the previously-described locking path for relay ES is interrupted at break contact GS–1 but is immediately transferred to make contact GS–18 and completed to ground through make contact ES–16 of relay ES, break contacts CS–17 of relay CS, AS–16 of relay AS, DLOD–26 of relay DLOD, BRS–13 of relay BRS, AEV–30 of relay AEV and KP–24 of relay KP, make contacts PGE–1 of relay PGE, AV–1 of relay AV and ON–1 of relay ON.

Relay PGE releases at the end of the even digit scan cycle and this is followed by release of relay ES since the above-traced holding path is interrupted at make contact PGE–1 of relay PGE.

The closed contacts of the G register relays, G0, G1, G2, G4, and G7, are connected to the even scan area at this time through make contacts GS–4, GS–6, GS–8, GS–10, and GS–12 (FIG. 5) of relay GS, break contacts of relays ES and CS as previously identified, break contacts DLOD–14, DLOD–16, DLOD–18, DLOD–20, DLOD–22, and DLOD–24 of relay DLOD, break contacts of relays AS and BRS as previously identified, break contacts AEV–15, AEV–16, AEV–19, AEV–20, AEV–22 and AEV–25 of relay AEV, break contacts of relay KP as previously identified to the even scan area.

The remaining registers are scanned in the manner described and it will be noted that again in this instance the connections are made alternately to the even and odd areas of the scanning circuit even though arbitrary digits have been added and registered digits have been deleted.

While a specific embodiment of the invention has been selected for detailed disclosure, the invention is not, of course, limited in its application to the embodiment disclosed. The embodiment which has been described should be taken as illustrative of the invention rather than as restrictive thereof.

What is claimed is:

1. In a pulse sender including a plurality of consecutively related registering means for registering individual digit information and means for adding arbitrary digits and deleting registered digits, a scanning circuit including a first order area and a second order area, said areas having a common output path, a first line and a second line connected respectively to said first order area and said second order area, means for transmitting alternately over said lines to said respective areas information from said consecutively related registering means in turn, and means for maintaining said alternate relationship of transmission when the consecutive relationship of the registering means is changed by addition of arbitrary digits or deletion of registered digits.

2. In a pulse sender the combination defined by claim 1 further characterized in that said maintaining means includes a first and a second relay effective upon operation to reverse the connections of said lines to the respective areas, means for operating said first relay upon deletion of an odd number of registered digits and means for operating said second relay upon addition to an even number of arbitrary digits.

3. In a pulse sender including a plurality of registering means for registering individual digit information and means for adding arbitrary digits and deleting registered digits, a scanning circuit including a first order area and a second order area, a first line and a second line connected respectively to said first order area and said second order area, means for connecting a first selected group of said registering means to said first line and a second selected group of said registering means to said second line, means for transmitting registered information alternately over said first and said second lines to said scanning circuit, and means effective upon deletion of a number of registered digits for reversing the connection of said lines to said areas.

4. In a pulse sender, the combination defined by claim 3 further characterized in that said number is an odd number.

5. In a pulse sender including a plurality of registering means for registering individual digit information and means for adding arbitrary digits and deleting registered digits, a scanning circuit including a first order area and a second order area, said areas having a common output path, a first line and a second line connected respectively to said first order area and said second order area, means for connecting a first selected group of said registering means to said first line and a second selected group of said registering means to said second line, means for transmitting registered information alternately over said first and said second lines to said scanning circuit, and means effective upon addition of a number of arbitrary digits for reversing the connection of said lines to said areas.

6. In a pulse sender, the combination defined by claim 5 further characterized in that said number is an even number.

7. In a pulse sender including a plurality of registering means for registering individual digit information and means for adding arbitrary digits and deleting registered digits, a scanning circuit including a first order area and a second order area, a first line and a second line connected respectively to said first order area and said second order area, means for connecting a first selected group of said registering means to said first line and a second selected group of said registering means to said second line, means for transmitting registered information alternately over said first and said second lines to said scanning circuit, and means effective both upon deletion of an odd number of registered digits and upon addition of an even number of arbitrary digits for reversing the connection of said lines to said areas.

8. In a frequency shift pulse sender including a plurality of registering means for registering individual digit information and means for adding arbitrary digits and deleting registered digits, a scanning circuit including a first order area and a second order area, a first line and a second line connected respectively to said first order area and said second order area, means for connecting a first selected group of said registering means to said first line and a second selected group of said registering means to said second line, means for transmitting registered information alternately over said first and second lines from the connected registering means to the scanning circuit, a first relay and a second relay, operation of each of said relays being effective to reverse the connection of said lines to said areas, means effective upon the addition of an even number of arbitrary digits for operating said first relay, and means effective upon the deletion of an odd number of registered digits for operating said second relay.

9. In a frequency shift pulse sender the combination defined by claim 8 further characterized in that said connecting means includes a steering relay individual to each of said registering means, an operating path for each of said steering relays, a first locking path for each of said steering relays effective when a respective relay operates to hold it in operated position, and a second locking path for each of said steering relays, operation of said first relay and said second relay also being effective to interrupt the respective first locking path for each operated steering relay and to complete the respective second locking path therefor.

10. In a frequency shift pulse sender including a plurality of registering means for registering individual digit information and means for adding arbitrary digits and deleting registered digits, a scanning circuit including a first order area and a second order area, said areas having a common output path, a first line and a second line connected respectively to said first order area and said second order area, means for connecting a first selected group of said registering means to said first line and a second selected group of said registering means to said second line, means for transmitting information from one of said first group of registering means over said first line to said scanning circuit, means effective while said transmitted information is being scanned for transmitting information from one of said second group of registering means over said second line to said scanning circuit for subsequent scanning, and means effective both upon addition of an even number of arbitrary digits and upon deletion of an odd number of registered digits for reversing the connection of said lines to said areas.

11. In a telephone system, a sender comprising a scanning circuit having an odd-scanning area and an even scanning area, a feed line connected to each of said scanning areas, digit registering means, a digit steering circuit for steering alternate digits to said feed lines, a digit being steered to one feed line while the priorly steered digit on the other feed line is being scanned, means for registering the addition and deletion of digits, and means responsive to said last mentioned means for reversing the connections of said feed lines to said scanning areas.

No references cited.